United States Patent
Jang

(10) Patent No.: US 12,519,181 B2
(45) Date of Patent: Jan. 6, 2026

(54) POLYMER COMPOSITE SEPARATOR FOR A LITHIUM SECONDARY BATTERY AND MANUFACTURING METHOD

(71) Applicant: Global Graphene Group, Inc., Dayton, OH (US)

(72) Inventor: Bor Z. Jang, Centerville, OH (US)

(73) Assignee: Honeycomb Battery Company, Dayton, OH (US)

( * ) Notice: Subject to any disclaimer, the term of this patent is extended or adjusted under 35 U.S.C. 154(b) by 573 days.

(21) Appl. No.: 17/324,747

(22) Filed: May 19, 2021

(65) Prior Publication Data

US 2022/0407182 A1    Dec. 22, 2022

(51) Int. Cl.
| | |
|---|---|
| *H01M 4/00* | (2006.01) |
| *H01M 4/505* | (2010.01) |
| *H01M 4/525* | (2010.01) |
| *H01M 4/58* | (2010.01) |
| *H01M 4/62* | (2006.01) |
| *H01M 10/0525* | (2010.01) |
| *H01M 10/0569* | (2010.01) |

(Continued)

(52) U.S. Cl.
CPC ......... *H01M 50/451* (2021.01); *H01M 4/505* (2013.01); *H01M 4/525* (2013.01); *H01M 4/5825* (2013.01); *H01M 4/622* (2013.01); *H01M 10/0525* (2013.01); *H01M 10/0569* (2013.01); *H01M 50/403* (2021.01); *H01M 50/44* (2021.01); *H01M 2300/0037* (2013.01)

(58) Field of Classification Search
CPC ...... H01M 4/62; H01M 50/44; H01M 50/446; H01M 10/0569; H01M 4/5825; H01M 4/622; H01M 4/525; H01M 50/403
See application file for complete search history.

(56) References Cited

U.S. PATENT DOCUMENTS

| | | | |
|---|---|---|---|
| 5,393,621 A | 2/1995 | Chaloner-Gill | |
| 5,900,146 A * | 5/1999 | Ballard | C08F 2/44 252/62.51 C |

(Continued)

FOREIGN PATENT DOCUMENTS

| | | |
|---|---|---|
| CN | 110120549 A | 8/2019 |
| KR | 1020130051227 A | 5/2013 |
| KR | 1020200106760 A | 9/2020 |

OTHER PUBLICATIONS

International Application No. PCT/US2022/072443; International Search Report dated Sep. 13, 2022; 4 pages.

*Primary Examiner* — Tiffany Legette
*Assistant Examiner* — Monique M Wills

(57) ABSTRACT

A flame-resistant polymer composite separator for use in a lithium battery, wherein the polymer composite separator comprises (a) a binder or matrix polymer; (b) 0.1% to 50% by weight of a lithium salt dispersed in the polymer; and (c) from 30% to 99% by weight of particles or fibers of an inorganic material or polymer fibers that are dispersed in or bonded by the polymer, wherein the polymer is a polymerization or crosslinking product of a reactive additive comprising (i) a first liquid solvent that is polymerizable, (ii) an initiator or crosslinking agent, and (iii) the lithium salt and wherein the polymer composite separator has a thickness from 50 nm to 100 μm and a lithium ion conductivity from $10^{-8}$ S/cm to $5\times10^{-2}$ S/cm at room temperature.

31 Claims, 6 Drawing Sheets

(51) Int. Cl.
*H01M 50/403* (2021.01)
*H01M 50/44* (2021.01)
*H01M 50/451* (2021.01)

(56) References Cited

U.S. PATENT DOCUMENTS

| | | | | |
|---|---|---|---|---|
| 7,112,389 B1* | 9/2006 | Arora | ............... | H01M 50/489 |
| | | | | 429/142 |
| 10,468,718 B2* | 11/2019 | Lee | ............... | H01M 10/052 |
| 2017/0133716 A1 | 5/2017 | Masuda et al. | | |
| 2021/0091370 A1* | 3/2021 | Yamada | ............... | H01M 4/463 |

* cited by examiner

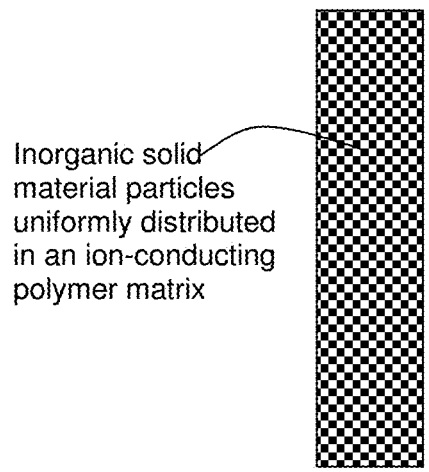

Inorganic solid material particles uniformly distributed in an ion-conducting polymer matrix

FIG. 3(A)

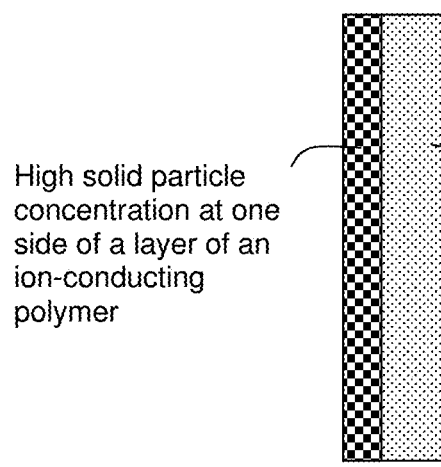

High solid particle concentration at one side of a layer of an ion-conducting polymer This side has a low concentration of inorganic solid material particles

FIG. 3(B)

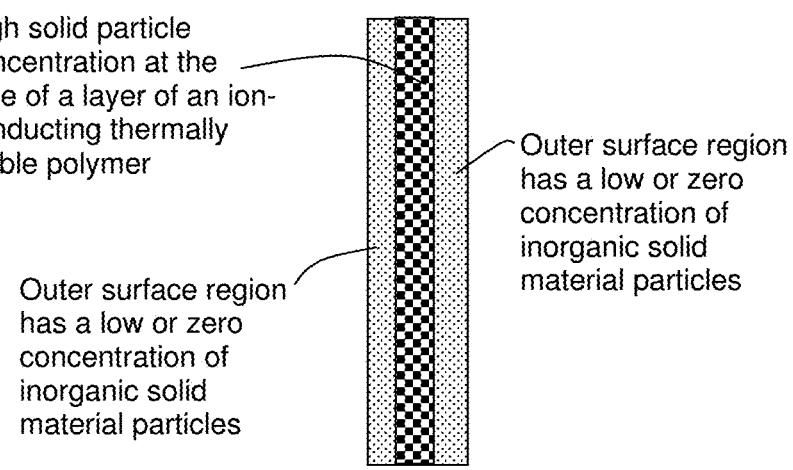

High solid particle concentration at the core of a layer of an ion-conducting thermally stable polymer Outer surface region has a low or zero concentration of inorganic solid material particles Outer surface region has a low or zero concentration of inorganic solid material particles

FIG. 3(C)

POLYMER COMPOSITE SEPARATOR FOR A LITHIUM SECONDARY BATTERY AND MANUFACTURING METHOD

FIELD

The present invention relates to the field of rechargeable lithium battery, including the lithium-ion battery and lithium metal battery, and, in particular, to an anode-less rechargeable lithium metal battery having no lithium metal as an anode active material initially when the battery is made and a method of manufacturing same.

BACKGROUND

Lithium-ion and lithium (Li) metal cells (including Lithium-sulfur cell, Li-air cell, etc.) are considered promising power sources for electric vehicle (EV), hybrid electric vehicle (HEV), and portable electronic devices, such as lap-top computers and mobile phones. Lithium metal has the highest capacity (3,861 mAh/g) compared to any other metal or metal-intercalated compound (except $Li_{4.4}Si$) as an anode active material. Hence, in general, rechargeable Li metal batteries have a significantly higher energy density than lithium-ion batteries.

Historically, rechargeable lithium metal batteries were produced using non-lithiated compounds having high specific capacities, such as $TiS_2$, $MoS_2$, $MnO_2$, $CoO_2$ and $V_2O_5$, as the cathode active materials, which were coupled with a lithium metal anode. When the battery was discharged, lithium ions were dissolved from the lithium metal anode and transferred to the cathode through the electrolyte and, thus, the cathode became lithiated. Unfortunately, upon cycling, the lithium metal resulted in the formation of dendrites that ultimately caused unsafe conditions in the battery. As a result, the production of these types of secondary batteries was stopped in the early 1990's giving ways to lithium-ion batteries.

Even now, cycling stability and safety concerns remain the primary factors preventing the further commercialization of Li metal batteries for EV, HEV, and microelectronic device applications. These issues are primarily due to the high tendency for Li to form dendrite structures during repeated charge-discharge cycles or an overcharge, leading to internal electrical shorting and thermal runaway. Many attempts have been made to address the dendrite-related issues, as briefly summarized below:

Fauteux, et al. [D. Fauteux, et al., "Secondary Electrolytic Cell and Electrolytic Process," U.S. Pat. No. 5,434,021, Jul. 18, 1995] applied to a metal anode a protective surface layer (e.g., a mixture of polynuclear aromatic and polyethylene oxide) that enables transfer of metal ions from the metal anode to the electrolyte and back. The surface layer is also electronically conductive so that the ions will be uniformly attracted back onto the metal anode during electrodeposition (i.e. during battery recharge). Alamgir, et al. [M. Alamgir, et al. "Solid polymer electrolyte batteries containing metallocenes," U.S. Pat. No. 5,536,599, Jul. 16, 1996] used ferrocenes to prevent chemical overcharge and dendrite formation in a solid polymer electrolyte-based rechargeable battery.

Skotheim [T. A. Skotheim, "Stabilized Anode for Lithium-Polymer Battery," U.S. Pat. No. 5,648,187 (Jul. 15, 1997); U.S. Pat. No. 5,961,672 (Oct. 5, 1999)] provided a Li metal anode that was stabilized against the dendrite formation by the use of a vacuum-evaporated thin film of a Li ion-conducting polymer interposed between the Li metal anode and the electrolyte. Skotheim, et al. [T. A. Skotheim, et al. "Lithium Anodes for Electrochemical Cells," U.S. Pat. No. 6,733,924 (May 11, 2004); U.S. Pat. No. 6,797,428 (Sep. 28, 2004); U.S. Pat. No. 6,936,381 (Aug. 30, 2005); and U.S. Pat. No. 7,247,408 (Jul. 24, 2007)] further proposed a multilayer anode structure consisting of a Li metal-based first layer, a second layer of a temporary protective metal (e.g., Cu, Mg, and Al), and a third layer that is composed of at least one layer (typically 2 or more layers) of a single ion-conducting glass, such as lithium silicate and lithium phosphate, or polymer. It is clear that such an anode structure, consisting of at least 3 or 4 layers, is too complex and too costly to make and use.

Protective coatings for Li anodes, such as glassy surface layers of $LiI$—$Li_3PO_4$—$P_2S_5$, may be obtained from plasma assisted deposition [S. J. Visco, et al., "Protective Coatings for Negative Electrodes," U.S. Pat. No. 6,025,094 (Feb. 15, 2000)]. Complex, multi-layer protective coatings were also proposed by Visco, et al. [S. J. Visco, et al., "Protected Active Metal Electrode and Battery Cell Structures with Non-aqueous Interlayer Architecture," U.S. Pat. No. 7,282,295 (Oct. 16, 2007); U.S. Pat. No. 7,282,296 (Oct. 16, 2007); and U.S. Pat. No. 7,282,302 (Oct. 16, 2007)].

Despite these earlier efforts, no rechargeable Li metal batteries have yet succeeded in the marketplace. This is likely due to the notion that these prior art approaches still have major deficiencies. For instance, in several cases, the anode or electrolyte structures are too complex. In others, the materials are too costly or the processes for making these materials are too laborious or difficult. Conventional solid electrolytes typically have a low lithium-ion conductivity, are difficult to produce and difficult to implement into a battery.

Furthermore, the conventional solid electrolyte, as the sole electrolyte in a cell or as an anode-protecting layer (interposed between the lithium film and another electrolyte) does not have and cannot maintain a good contact with the lithium metal. This reduces the effectiveness of the electrolyte to support dissolution of lithium ions (during battery discharge), transport lithium ions, and allowing the lithium ions to re-deposit back to the lithium anode (during battery recharge). A ceramic separator that is disposed between an anode active material layer (e.g., a graphite-based anode layer or a lithium metal layer) and a cathode active layer suffers from the same problems as well. In addition, a ceramic separator also has a poor contact with the cathode layer if the electrolyte in the cathode layer is a solid electrolyte (e.g., inorganic solid electrolyte).

Another major issue associated with the lithium metal anode is the continuing reactions between liquid electrolyte and lithium metal, leading to repeated formation of "dead lithium-containing species" that cannot be re-deposited back to the anode and become isolated from the anode. These reactions continue to irreversibly consume electrolyte and lithium metal, resulting in rapid capacity decay. In order to compensate for this continuing loss of lithium metal, an excessive amount of lithium metal (3-5 times higher amount than what would be required) is typically implemented at the anode when the battery is made. This adds not only costs but also a significant weight and volume to a battery, reducing the energy density of the battery cell. This important issue has been largely ignored and there has been no plausible solution to this problem in battery industry.

Clearly, an urgent need exists for a simpler, more cost-effective, and easier to implement approach to preventing Li metal dendrite-induced internal short circuit and thermal runaway problems in Li metal batteries, and to reducing or eliminating the detrimental reactions between lithium metal and the electrolyte.

Hence, an object of the present disclosure was to provide an effective way to overcome the lithium metal dendrite and reaction problems in all types of Li metal batteries having a lithium metal anode. A specific object of the present disclosure was to provide a lithium cell (either lithium-ion cell or lithium metal cell) that exhibits a high specific capacity, high specific energy, high degree of safety, and a long and stable cycle life.

SUMMARY

The present disclosure provides a flame-resistant polymer composite separator for use in a lithium battery, wherein the polymer composite separator comprises (a) a binder or matrix polymer; (b) 0.1% to 50% by weight of a lithium salt dispersed in the binder/matrix polymer; and (c) from 30% to 99% by weight ((preferably >60%, more preferably >70%, and further preferably >80% by weight) of particles or fibers of an inorganic material or polymer fibers that are dispersed in or bonded by the binder/matrix polymer, wherein the binder/matrix polymer is a polymerization or crosslinking product of a reactive additive comprising (i) a first liquid solvent that is polymerizable, (ii) an initiator or crosslinking agent, and (iii) the lithium salt and wherein the polymer composite separator has a thickness from 50 nm to 100 μm (preferably from 1 to 20 μm and more preferably thinner than 10 μm) and a lithium ion conductivity from $10^{-8}$/cm to $5 \times 10^{-2}$ S/cm at room temperature.

The first liquid solvent is preferably selected from the group consisting of vinylene carbonate, ethylene carbonate, fluoroethylene carbonate, vinyl sulfite, vinyl ethylene sulfite, vinyl ethylene carbonate, 1,3-propyl sultone, 1,3,5-trioxane (TXE), 1,3-acrylic-sultones, methyl ethylene sulfone, methyl vinyl sulfone, ethyl vinyl sulfone, methyl methacrylate, vinyl acetate, acrylamide, 1,3-dioxolane (DOL), fluorinated ethers, fluorinated esters, sulfones, sulfides, dinitriles, acrylonitrile (AN), sulfates, siloxanes, silanes, N-methylacetamide, acrylates, ethylene glycols, tetrahydrofuran, combinations thereof, and combinations thereof with phosphates, phosphonates, phosphinates, phosphines, phosphine oxides, phosphonic acids, phosphorous acid, phosphites, phosphoric acids, phosphazene compounds, ionic liquids, derivatives thereof, and mixtures thereof.

In certain embodiments, the inorganic material comprises particles of an inorganic solid electrolyte material selected from an oxide type, sulfide type, hydride type, halide type, borate type, phosphate type, lithium phosphorus oxynitride (LiPON), Garnet-type, lithium superionic conductor (LISICON) type, sodium superionic conductor (NASICON) type, or a combination thereof.

In some embodiments, the inorganic material particles comprise a material selected from a transition metal oxide, aluminum oxide, silicon dioxide, transition metal sulfide, transition metal selenide, alkylated ceramic particles, metal phosphate, metal carbonate, or a combination thereof. Further, the inorganic material fibers may be selected from ceramic fibers, glass fibers, or a combination thereof.

In some embodiments, the polymer fibers comprise polymeric materials selected from the group consisting essentially of polyacrylonitriles, polyolefins, polyolefin copolymers, polyamides, polyimides, polyvinyl alcohol, polyethylene terephthalate, polybutylene terephthalate, polysulfone, polyvinyl fluoride, polyvinylidene fluoride, polyvinylidene fluoride-hexafluoropropylene, polymethyl pentene, polyphenylene sulfide, polyacetyl, polyurethane, aromatic polyamide, semi-aromatic polyamide, polypropylene terephthalate, polymethyl methacrylate, polystyrene, synthetic cellulosic polymers, polyaramids, rigid-rod polymers, ladder polymers, and blends, mixtures and copolymers including said polymeric materials.

The lithium salt may be selected from lithium perchlorate, $LiClO_4$, lithium hexafluorophosphate, $LiPF_6$, lithium borofluoride, $LiBF_4$, lithium hexafluoroarsenide, $LiAsF_6$, lithium trifluoro-methanesulfonate, $LiCF_3SO_3$, bis-trifluoromethyl sulfonylimide lithium, $LiN(CF_3SO_2)_2$, lithium bis(oxalato) borate, LiBOB, lithium oxalyldifluoroborate, $LiBF_2C_2O_4$, lithium oxalyldifluoroborate, $LiBF_2C_2O_4$, lithium nitrate, $LiNO_3$, Li-Fluoroalkyl-Phosphates, $LiPF_3(CF_2CF_3)_3$, lithium bisperfluoro-ethylsulfonylimide, LiBETI, lithium bis(trifluoromethanesulfonyl)imide, lithium bis(fluorosulfonyl)imide, lithium trifluoromethanesulfonimide, LiTFSI, an ionic liquid-based lithium salt, $Li_2CO_3$, $Li_2O$, $Li_2C_2O_4$, LiOH, LiX, $ROCO_2Li$, HCOLi, ROLi, $(ROCO_2Li)_2$, $(CH_2OCO_2Li)_2$, $Li_2S$, $Li_xSO_y$, or a combination thereof, wherein X=F, Cl, I, or Br, R=a hydrocarbon group, x=0-1, y=1-4.

In certain desired embodiments, the polymer forms a mixture, blend, copolymer, or interpenetrating network with a lithium ion-conducting polymer selected from poly(ethylene oxide), polypropylene oxide, polyoxymethylene, polyvinylene carbonate, polypropylene carbonate, poly(ethylene glycol), poly(acrylonitrile), poly(methyl methacrylate), poly (vinylidene fluoride), poly bis-methoxy ethoxyethoxide-phosphazene, polyvinyl chloride, polydimethylsiloxane, poly(vinylidene fluoride)-hexafluoropropylene, cyanoethyl poly(vinyl alcohol), a pentaerythritol tetraacrylate-based polymer, an aliphatic polycarbonate, a single Li-ion conducting solid polymer with a carboxylate anion, a sulfonylimide anion, or sulfonate anion, poly(ethylene glycol) diacrylate, poly(ethylene glycol) methyl ether acrylate, polyurethane, polyurethan-urea, polyacrylamide, a polyionic liquid, polymerized 1,3-dioxolane, polyepoxide ether, polysiloxane, poly(acrylonitrile-butadiene), polynorbornene, poly(hydroxyl styrene), poly(ether ether ketone), polypeptoid, poly(ethylene-maleic anhydride), polycaprolactone, poly(trimethylene carbonate), a copolymer thereof, a sulfonated derivative thereof, or a combination thereof.

In certain embodiments, the polymer composite separator further comprises a second liquid solvent that permeates into the separator wherein the second liquid solvent has a higher flash point or lower vapor pressure as compared to the first liquid solvent. Such a second liquid solvent is capable of improving the lithium-ion conductivity and/or flame-retardancy of the composite separator and the battery cell.

The second liquid solvent may be selected from the group consisting of fluoroethylene carbonate, vinyl sulfite, vinyl ethylene sulfite, 1,3-propyl sultone, 1,3,5-trioxane (TXE), 1,3-acrylic-sultones, methyl ethylene sulfone, methyl vinyl sulfone, ethyl vinyl sulfone, methyl methacrylate, vinyl acetate, acrylamide, 1,3-dioxolane (DOL), fluorinated ethers, fluorinated esters, sulfones, sulfides, dinitriles, acrylonitrile (AN), sulfates, siloxanes, silanes, N-methylacetamide, acrylates, ethylene glycols, tetrahydrofuran, combinations thereof, and combinations thereof with phosphates, phosphonates, phosphinates, phosphines, phosphine oxides, phosphonic acids, phosphorous acid, phosphites, phosphoric acids, phosphazene compounds, ionic liquids, derivatives thereof, and mixtures thereof.

In certain embodiments, the first liquid solvent or the second liquid solvent is selected from the group consisting of 2-alkoxy (or phenoxy)-2-oxo-1,3,2-dioxaphospholane (I)

and 2-alkoxy (or phenoxy)-2-oxo-1,3,2-dioxaphosphorinane (II), derivatives thereof, and combinations thereof:

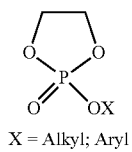

X = Alkyl; Aryl

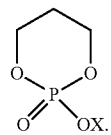

The first liquid solvent or the second liquid solvent may be chosen to comprise phosphate, phosphonate, phosphonic acid, or phosphite selected from TMP, TEP, TFP, TDP, DPOF, DMMP, DMMEMP, tris(trimethylsilyl)phosphite (TTSPi), alkyl phosphate, triallyl phosphate (TAP), a combination thereof, wherein TMP, TEP, TFP, TDP, DPOF, DMMP, and DMMEMP have the following chemical formulae:

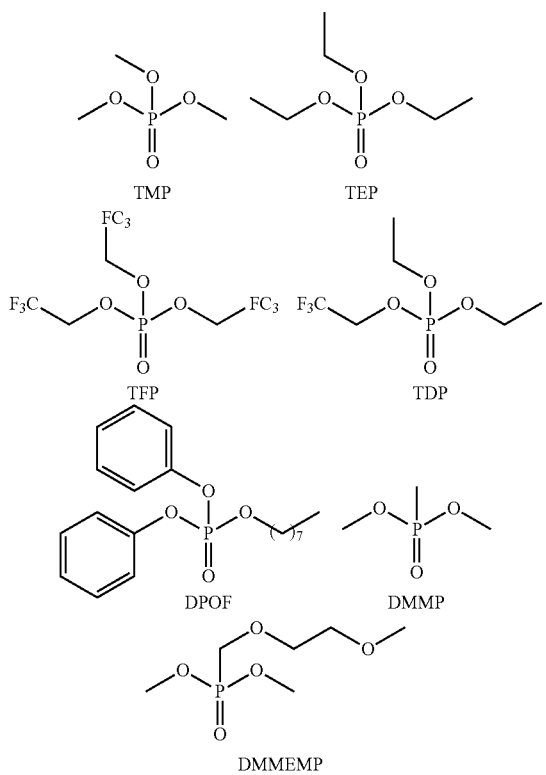

wherein an end group thereof or a functional group attached thereof comprises unsaturation for polymerization.

In some embodiments, the first liquid solvent or the second liquid solvent comprises phosphonate vinyl monomer selected from the group consisting of phosphonate bearing allyl monomers, phosphonate bearing vinyl monomers, phosphonate bearing styrenic monomers, phosphonate bearing (meth)acrylic monomers, vinylphosphonic acids, and combinations thereof. The phosphonate bearing allyl monomer may be selected from a Dialkyl allylphosphonate monomer or Dioxaphosphorinane allyl monomer; the phosphonate bearing vinyl monomers is selected from a Dialkyl vinyl phosphonate monomer or Dialkyl vinyl ether phosphonate monomer; the phosphonate bearing styrenic monomer is selected from α-, β-, or p-vinylbenzyl phosphonate monomers; or the phosphonate bearing (meth)acrylic monomer is selected from a monomer having a phosphonate group linked to the acrylate double bond, a phosphonate groups linked to the ester, or a phosphonate groups linked to the amide.

In certain embodiments, the crosslinking agent comprises a compound having at least one reactive group selected from a hydroxyl group, an amino group, an imino group, an amide group, an acrylic amide group, an amine group, an acrylic group, an acrylic ester group, or a mercapto group in the molecule. The crosslinking agent may be selected from poly(diethanol) diacrylate, poly(ethyleneglycol)dimethacrylate, poly(diethanol) dimethylacrylate, poly(ethylene glycol) diacrylate, or a combination thereof.

The initiator may be selected from an azo compound, azobisisobutyronitrile, azobisisoheptonitrile, dimethyl azobisisobutyrate, benzoyl peroxide tert-butyl peroxide and methyl ethyl ketone peroxide, benzoyl peroxide (BPO), bis(4-tert-butylcyclohexyl) peroxydicarbonate, t-amyl peroxypivalate, 2,2'-azobis-(2,4-dimethylvaleronitrile), 2,2'-azobis-(2-methylbutyronitrile), 1,1-azobis(cyclohexane-1-carbonitrile), benzoylperoxide (BPO), hydrogen peroxide, dodecamoyl peroxide, isobutyryl peroxide, cumene hydroperoxide, tert-butyl peroxypivalate, diisopropyl peroxydicarbonate, lithium hexafluorophosphate ($LiPF_6$), lithium borofluoride ($LiBF_4$), lithium hexafluoroarsenide ($LiAsF_6$), lithium trifluoro-methanesulfonate ($LiCF_3SO_3$), bis-trifluoromethyl sulfonylimide lithium ($LiN(CF_3SO_2)_2$), lithium bis(oxalato)borate (LiBOB), lithium oxalyldifluoroborate ($LiBF_2C_2O_4$), lithium oxalyldifluoroborate ($LiBF_2C_2O_4$), or a combination thereof.

In some embodiments, the inorganic material particles are non-uniformly distributed in the polymer matrix in such a manner that a concentration of the inorganic material particles in one region of the polymer matrix is greater than a concentration of the inorganic material particles in another region. For instance, one side of the separator (e.g., the side to be facing an anode layer) may be designed to contain a higher concentration of the inorganic particles (e.g., from 60% to 95%) while the opposite side (facing the cathode layer) contains a lower concentration of the inorganic particles, or vice versa. In some embodiments, in the polymer composite separator, the a concentration of the inorganic material particles in one surface region of the polymer matrix is at least 60% by volume (preferably at least 75%, more preferably at least 85% by volume, further preferably at least 90%, and most preferably at least 95%) and is greater than the concentration of the inorganic material particles in a core region of the polymer composite separator. The core region preferably contains a second liquid solvent dispersed therein.

In some preferred embodiments, the particles or fibers of an inorganic material and/or polymer fibers are in a woven or nonwoven fabric form, prior to being impregnated or infiltrated with the polymer.

The present disclosure also provides a lithium secondary battery comprising a cathode, an anode, and the aforementioned flame-resistant polymer composite separator, which is disposed between the cathode and the anode.

In certain embodiments, the anode in the lithium secondary battery has an amount of lithium or lithium alloy as an anode active material supported by an anode current collector. In certain other embodiments, initially the anode has no lithium or lithium alloy as an anode active material supported by the anode current collector when the battery is made and prior to a charge or discharge operation of the battery. This latter configuration is referred to as an anode-less lithium battery. During the first battery charge operation, lithium ions come out of the cathode active material, move to the anode, and deposit onto a surface of the anode current collector.

In certain embodiments, the battery is a lithium-ion battery and the anode has an anode current collector and a layer of an anode active material supported by the anode current collector, wherein the anode active materials is selected from the group consisting of: (a) silicon (Si), germanium (Ge), tin (Sn), lead (Pb), antimony (Sb), phosphorus (P), bismuth (Bi), zinc (Zn), aluminum (Al), titanium (Ti), nickel (Ni), cobalt (Co), and cadmium (Cd); (b) alloys or intermetallic compounds of Si, Ge, Sn, Pb, Sb, Bi, Zn, Al, Ti, Ni, Co, or Cd with other elements; (c) oxides, carbides, nitrides, sulfides, phosphides, selenides, and tellurides of Si, Ge, Sn, Pb, Sb, Bi, Zn, Al, Ti, Fe, Ni, Co, V, or Cd, and their mixtures, composites, or lithium-containing composites; (d) salts and hydroxides of Sn; (e) lithium titanate, lithium manganate, lithium aluminate, lithium titanium niobium oxide, lithium-containing titanium oxide, lithium transition metal oxide, $ZnCo_2O_4$; (f) carbon or graphite particles (g) prelithiated versions thereof; and (h) combinations thereof.

The anode current collector may be selected from, for instance, a Cu foil, a Cu-coated polymer film, a sheet of Ni foam, a porous layer of nano-filaments, such as graphene sheets, carbon nanofibers, carbon nano-tubes, etc.

Preferably, the inorganic material comprises an inorganic solid electrolyte material (dispersed in the thermally stable polymer composite separator layer) is in a fine powder form having a particle size preferably from 10 nm to 30 µm, more preferably from 50 nm to 1 µm. The inorganic solid electrolyte material may be selected from an oxide type, sulfide type, hydride type, halide type, borate type, phosphate type, lithium phosphorus oxynitride (LiPON), Garnet-type, lithium superionic conductor (LISICON), sodium superionic conductor (NASICON), or a combination thereof. These solid electrolyte particles can improve the lithium-ion transport rates of the composite separator.

The polymer composite separator preferably has a lithium-ion conductivity no less than $10^{-5}$ S/cm, more preferably no less than $10^{-4}$ S/cm, and most preferably no less than $10^3$ S/cm.

In some embodiments, the inorganic material particles comprise a material selected from a transition metal oxide (e.g., $TiO_2$), aluminum oxide, silicon dioxide, transition metal sulfide, transition metal selenide, alkylated ceramic particles, metal phosphate, metal carbonate, or a combination thereof. These particles act to stop the penetration of any potential lithium dendrite that otherwise could cause internal shorting.

In some embodiments, this polymer composite layer may be a thin film disposed against a surface of an anode current collector. The anode contains a current collector without a lithium metal or any other anode active material, such as graphite or Si particles, when the battery cell is manufactured. Such a battery cell having an initially lithium metal-free anode is commonly referred to as an "anode-less" lithium battery. The lithium ions that are required for shuttling back and forth between the anode and the cathode are initially stored in the cathode active materials (e.g., Li in $LiMn_2O_4$ and $LiMPO_4$, where M=Ni, Co, F, Mn, etc.).

During the first battery charge procedure, lithium ions ($Li^+$) come out of the cathode active material, move through the electrolyte and then through the presently disclosed protective high-elasticity polymer layer and get deposited on a surface of the anode current collector. As this charging procedure continues, more lithium ions get deposited onto the current collector surface, eventually forming a lithium metal film or coating.

In certain embodiments, the polymer further contains a reinforcement material dispersed therein wherein the reinforcement material is selected from a polymer fiber, a glass fiber, a ceramic fiber or nano-flake (e.g., nano clay flakes), or a combination thereof. The reinforcement material preferably has a thickness or diameter less than 100 nm.

The working electrolyte in the lithium battery may be selected from an organic liquid electrolyte, ionic liquid electrolyte, polymer gel electrolyte, solid polymer electrolyte, inorganic solid-state electrolyte, quasi-solid electrolyte having a lithium salt dissolved in an organic or ionic liquid with a lithium salt concentration higher than 2.0 M, or a combination thereof.

The cathode active material may be selected from an inorganic material, an organic material, a polymeric material, or a combination thereof. The inorganic material may be selected from a metal oxide, metal phosphate, metal silicide, metal selenide (e.g., lithium polyselides for use in a Li—Se cell), metal sulfide (e.g. lithium polysulfide for use in a Li—S cell), or a combination thereof. Preferably, these cathode active materials contain lithium in their structures; otherwise the cathode must contain a lithium source.

The inorganic cathode active material may be selected from a lithium cobalt oxide, lithium nickel oxide, lithium manganese oxide, lithium vanadium oxide, lithium-mixed metal oxide, lithium iron phosphate, lithium manganese phosphate, lithium vanadium phosphate, lithium mixed metal phosphate, lithium metal silicide, or a combination thereof.

The cathode active material layer may contain a metal oxide containing vanadium oxide selected from the group consisting of $Li_xVO_2$, $Li_xV_2O_5$, $Li_xV_3O_s$, $Li_xV_3O_7$, $Li_xV_4O_9$, $Li_xV_6O_{13}$, their doped versions, their derivatives, and combinations thereof, wherein $0.1 < x < 5$.

The cathode active material layer may contain a metal oxide or metal phosphate, selected from a layered compound $LiMO_2$, spinel compound $LiM_2O_4$, olivine compound $LiMPO_4$, silicate compound $Li_2MSiO_4$, Tavorite compound $LiMPO_4F$, borate compound $LiMBO_3$, or a combination thereof, wherein M is a transition metal or a mixture of multiple transition metals.

The cathode active material is preferably in a form of nano particle (spherical, ellipsoidal, and irregular shape), nano wire, nano fiber, nano tube, nano sheet, nano belt, nano ribbon, nano disc, nano platelet, or nano horn having a thickness or diameter less than 100 nm. These shapes can be collectively referred to as "particles" unless otherwise specified or unless a specific type among the above species is desired. Further preferably, the cathode active material has a dimension less than 50 nm, even more preferably less than 20 nm, and most preferably less than 10 nm. In some embodiments, one particle or a cluster of particles may be coated with or embraced by a layer of carbon disposed between the particle(s) and/or a high-elasticity polymer layer (an encapsulating shell).

The cathode layer may further contain a graphite, graphene, or carbon material mixed with the cathode active material particles. The carbon or graphite material is selected from polymeric carbon, amorphous carbon, chemical vapor deposition carbon, coal tar pitch, petroleum pitch, meso-phase pitch, carbon black, coke, acetylene black, activated carbon, fine expanded graphite particle with a dimension smaller than 100 nm, artificial graphite particle, natural graphite particle, or a combination thereof. Graphene may be selected from pristine graphene, graphene oxide, reduced graphene oxide, graphene fluoride, hydrogenated graphene, nitrogenated graphene, functionalized graphene, etc.

The cathode active material particles may be coated with or embraced by a conductive protective coating, which is selected from a carbon material, graphene, electronically conductive polymer, conductive metal oxide, or conductive metal coating.

In certain embodiments, the polymer composite separator layer has two primary surfaces with a first primary surface facing the anode side and a second primary surface opposing or opposite to the first primary surface and wherein the inorganic material particles (e.g., inorganic solid electrolyte powder) has a first concentration at the first surface and a second concentration at the second surface and the first concentration is greater than the second concentration. In other words, there are more inorganic particles at the anode side of the polymer composite layer than the opposite side intended to be facing the cathode. There is a concentration gradient across the thickness of the elastic composite separator layer. The high concentration of inorganic solid particles on the anode side (preferably >30% by weight and more preferably >60% by weight) can help stop the penetration of any lithium dendrite, if formed, and help to form a stable artificial solid-electrolyte interphase (SEI). Thus, in some embodiments, the composite separator has a gradient concentration of the inorganic solid particles across the thickness of the separator.

The disclosure also provides a process for manufacturing the polymer composite separator described above, the process comprising (A) dispersing particles or fibers of the inorganic solid material or polymer fibers and the lithium salt in the first liquid solvent to form a liquid reactive mass or reactive slurry; (B) dispensing and depositing a layer of the liquid reactive mass onto a solid substrate surface; and (C) polymerizing and/or curing the reactive mass to form this layer of polymer composite separator.

This reactive mass (a precursor to the desired polymer) may comprise a monomer, an oligomer, or an uncured (but curable) polymer possibly dissolved in a liquid solvent where necessary. This precursor is subsequently cured (polymerized and/or crosslinked).

This solid substrate can be a glass surface, a polymer film surface, a metal foil surface, etc. in order to form a free-standing film for a polymer composite separator. In certain preferred embodiments, the solid substrate may be an anode current collector, an anode active material layer, or a cathode active material layer. In other words, this polymer composite separator can be directly deposited onto a layer of anode active material, an anode current collector, or a layer of cathode active material. This is achievable because curing of the polymer does not require a high temperature; curing temperature being typically lower than 300° C. or even lower than 100° C. This is in stark contrast to the typically 900-1,200° C. required of sintering an inorganic solid electrolyte to form a ceramic separator. In addition, the presently disclosed polymer composite separator is at least as good as a ceramic separator in terms of reducing interfacial impedance and stopping dendrite penetration.

Preferably, the process is a roll-to-roll process wherein step (B) comprises (i) continuously feeding a layer of the solid substrate (e.g. flexible metal film, plastic film, etc.) from a feeder roller to a dispensing zone where the reactive mass is dispensed and deposited onto the solid substrate to form a continuous layer of the reactive mass; (ii) moving the layer of the reactive mass into a reacting zone where the reactive mass is exposed to heat, ultraviolet (UV) light, or high-energy radiation (e.g., electron beam) to polymerize and/or cure the reactive mass to form a continuous layer of polymer composite; and (iii) collecting the polymer composite on a winding roller. This process is conducted in a reel-to-reel manner.

The process may further comprise cutting and trimming the layer of polymer composite into one or multiple pieces of composite separators. The process may further comprise combining an anode, the polymer composite separator, an electrolyte, and a cathode electrode to form a lithium battery.

The disclosure further provides a process for manufacturing the polymer composite separator described above, the process comprising (A) forming a woven or nonwoven fabric comprising at least one of the polymer fibers and inorganic material fibers, and optional particles of the inorganic solid material; (B) dissolving or dispersing the lithium salt and the initiator or crosslinking agent in the first liquid solvent to form a liquid reactive mass; (C) impregnating or infiltrating a desired amount of the liquid reactive mass into the fabric; and (D) polymerizing and/or crosslinking said reactive mass to form the layer of polymer composite separator. The process may further comprise a step (E) of combining an anode, the woven or nonwoven fabric, and a cathode to form a lithium battery cell, wherein step (C) or both steps (C) and (D) are conducted either before or after step (E).

BRIEF DESCRIPTION OF THE DRAWINGS

FIG. 3(A) Schematic of a polymer elastic composite separator layer wherein the inorganic solid electrolyte particles are uniformly dispersed in a matrix of a thermally stable polymer according to some embodiments of the present disclosure.

FIG. 3(B) Schematic of a polymer composite separator layer wherein the inorganic solid electrolyte particles are preferentially dispersed near one surface (e.g., facing the anode side) of a polymer composite separator layer; the opposing surface has a lower or zero concentration of the inorganic solid electrolyte particles, according to some embodiments of the present disclosure.

FIG. 3(C) Schematic of a polymer composite separator layer wherein the inorganic solid electrolyte particles are preferentially dispersed at the core of a polymer composite separator layer; the outer regions have a lower or zero concentration of the inorganic solid electrolyte particles, according to some embodiments of the present disclosure. Alternatively, the core region may have a lower or zero concentration of the inorganic solid electrolyte particles, but one or bother outer surface regions have a high concentration (e.g., 60-98% by volume).

DESCRIPTION

Figure 1:
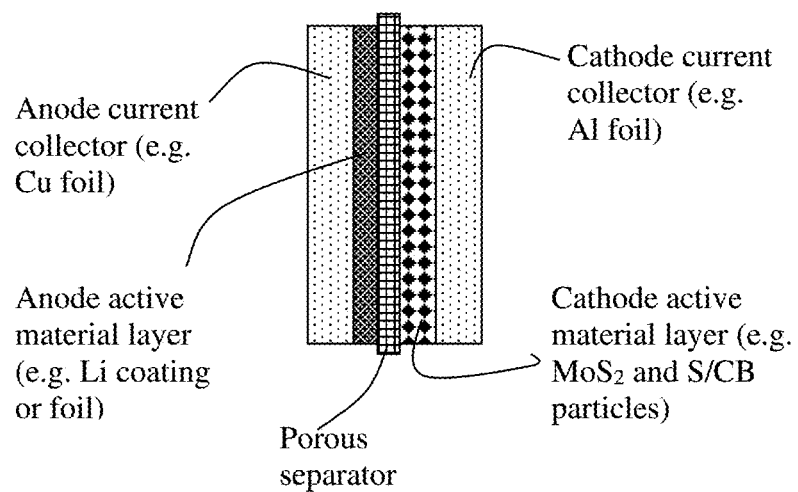
FIG. 1 Schematic of a prior art lithium metal battery cell, containing an anode layer (a thin Li foil or Li coating deposited on a surface of a current collector, Cu foil), a porous separator, and a cathode active material layer, which is composed of particles of a cathode active material, a conductive additive (not shown) and a resin binder (not shown). A cathode current collector supporting the cathode active layer is also shown.

This disclosure is related to a lithium secondary battery, which is preferably based on a working electrolyte selected from an organic electrolyte, a polymer gel electrolyte, a solid polymer electrolyte, an ionic liquid electrolyte, a quasi-solid electrolyte, or an inorganic solid-state electrolyte in the anode and/or the cathode. The anode and the cathode are separated by a solid-state polymer composite separator. The shape of a lithium secondary battery can be cylindrical, square, button-like, etc. The present invention is not limited to any battery shape or configuration or any type of electrolyte.

The present disclosure provides a flame-resistant polymer composite separator for use in a lithium battery, wherein the polymer composite separator comprises (a) a binder or matrix polymer (also referred to as the binder/matrix polymer); (b) 0.1% to 50% by weight of a lithium salt dispersed in the binder/matrix polymer; and (c) from 30% to 99% by weight (preferably >60%, more preferably >70%, and further preferably >80% by weight) of particles or fibers of an inorganic material or polymer fibers that are dispersed in or bonded by the binder/matrix polymer, wherein the binder/matrix polymer is a polymerization or crosslinking product of a reactive additive comprising (i) a first liquid solvent that is polymerizable, (ii) an initiator or crosslinking agent, and (iii) the lithium salt and wherein the polymer composite separator has a thickness from 50 nm to 100 µm (preferably from 1 to 20 µm and more preferably thinner than 10 µm) and a lithium ion conductivity from $10^{-8}$/cm to $5\times10^{-2}$ S/cm at room temperature.

This separator can be used in a lithium cell wherein, in a typical configuration, the separator is in ionic contact with both the anode and the cathode of the battery cell and typically in physical contact with an anode active material layer (or an anode current collector) and with a cathode active material layer.

The first liquid solvent is preferably selected from the group consisting of vinylene carbonate, ethylene carbonate, fluoroethylene carbonate, vinyl sulfite, vinyl ethylene sulfite, vinyl ethylene carbonate, 1,3-propyl sultone, 1,3,5-trioxane (TXE), 1,3-acrylic-sultones, methyl ethylene sulfone, methyl vinyl sulfone, ethyl vinyl sulfone, methyl methacrylate, vinyl acetate, acrylamide, 1,3-dioxolane (DOL), fluorinated ethers, fluorinated esters, sulfones, sulfides, dinitriles, acrylonitrile (AN), sulfates, siloxanes, silanes, N-methylacetamide, acrylates, ethylene glycols, tetrahydrofuran, combinations thereof, and combinations thereof with phosphates, phosphonates, phosphinates, phosphines, phosphine oxides, phosphonic acids, phosphorous acid, phosphites, phosphoric acids, phosphazene compounds, ionic liquids, derivatives thereof, and mixtures thereof. These polymerizable liquid solvents (monomers or curable oligomers) can be impregnated into a backbone structure (e.g., a layer of nonwoven fabric) of the separator and optionally into the anode and the cathode layers of a battery cell and then cured (polymerized and/or crosslinked).

In some embodiments, the binder/matrix polymer forms a mixture, blend, copolymer, or interpenetrating network with a lithium ion-conducting polymer selected from poly(ethylene oxide), polypropylene oxide, polyoxymethylene, polyvinylene carbonate, polypropylene carbonate, poly(ethylene glycol), poly(acrylonitrile), poly(methyl methacrylate), poly(vinylidene fluoride), poly bis-methoxy ethoxyethoxide-phosphazene, polyvinyl chloride, polydimethylsiloxane, poly(vinylidene fluoride)-hexafluoropropylene, cyanoethyl poly(vinyl alcohol), a pentaerythritol tetraacrylate-based polymer, an aliphatic polycarbonate, a single Li-ion conducting solid polymer with a carboxylate anion, a sulfonylimide anion, or sulfonate anion, poly(ethylene glycol) diacrylate, poly(ethylene glycol) methyl ether acrylate, polyurethane, polyurethan-urea, polyacrylamide, a polyionic liquid, polymerized 1,3-dioxolane, polyepoxide ether, polysiloxane, poly(acrylonitrile-butadiene), polynorbornene, poly(hydroxyl styrene), poly(ether ether ketone), polypeptoid, poly(ethylene-maleic anhydride), polycaprolactone, poly(trimethylene carbonate), a copolymer thereof, a sulfonated derivative thereof, or a combination thereof. Mixing, co-polymerizing or semi-IPN formation methods are well-known in the art. For instance, one can simply dissolve the two polymers and/or their monomers in a common solvent, following by solvent removal to form a polymer blend. Chemical reaction between chains can be activated while these polymers/monomers are in a solution state or a solid mixed state.

The inorganic material may comprise particles of an inorganic solid electrolyte material selected from an oxide type, sulfide type, hydride type, halide type, borate type, phosphate type, lithium phosphorus oxynitride (LiPON), Garnet-type, lithium superionic conductor (LISICON) type, sodium superionic conductor (NASICON) type, or a combination thereof.

In some embodiments, the inorganic material particles comprise a material selected from a transition metal oxide, aluminum oxide, silicon dioxide, transition metal sulfide, transition metal selenide, alkylated ceramic particles, metal phosphate, metal carbonate, or a combination thereof. Further, the inorganic material fibers may be selected from ceramic fibers, glass fibers, or a combination thereof. The glass fibers, ceramic fibers, and/or polymer fibers may be made into a woven or nonwoven fabric as a backbone for the separator. This porous backbone is then impregnated with the binder/matrix polymer.

In some embodiments, the polymer fibers comprise polymeric materials selected from the group consisting essentially of polyacrylonitriles, polyolefins, polyolefin copolymers, polyamides, polyimides, polyvinyl alcohol, polyethylene terephthalate, polybutylene terephthalate, polysulfone, polyvinyl fluoride, polyvinylidene fluoride, polyvinylidene fluoride-hexafluoropropylene, polymethyl pentene, polyphenylene sulfide, polyacetyl, polyurethane, aromatic polyamide, semi-aromatic polyamide, polypropylene terephthalate, polymethyl methacrylate, polystyrene, synthetic cellulosic polymers, polyaramids, rigid-rod polymers, ladder polymers, and blends, mixtures and copolymers including said polymeric materials. Aramid fibers are particularly useful polymer fibers due to their high thermal stability and mechanical strength.

The lithium salt dispersed in the first (polymerizable) liquid solvent and thus the subsequently polymerized polymer may be selected from lithium perchlorate, $LiClO_4$, lithium hexafluorophosphate, $LiPF_6$, lithium borofluoride, $LiBF_4$, lithium hexafluoroarsenide, $LiAsF_6$, lithium trifluoro-methanesulfonate, $LiCF_3SO_3$, bis-trifluoromethyl sulfonylimide lithium, $LiN(CF_3SO_2)_2$, lithium bis(oxalato) borate, LiBOB, lithium oxalyldifluoroborate, $LiBF_2C_2O_4$, lithium oxalyldifluoroborate, $LiBF_2C_2O_4$, lithium nitrate, $LiNO_3$, Li-Fluoroalkyl-Phosphates, $LiPF_3(CF_2CF_3)_3$, lithium bisperfluoro-ethylsulfonylimide, LiBETI, lithium bis(trifluoromethanesulfonyl)imide, lithium bis(fluorosulfonyl)imide, lithium trifluoromethanesulfonimide, LiTFSI, an ionic liquid-based lithium salt, $Li_2CO_3$, $Li_2O$, $Li_2C_2O_4$, LiOH, LiX, $ROCO_2Li$, HCOLi, ROLi, $(ROCO_2Li)_2$, $(CH_2OCO_2Li)_2$, $Li_2S$, $Li_xSO_y$, or a combination thereof, wherein X=F, Cl, I, or Br, R=a hydrocarbon group, x=0-1, y=1-4.

In certain embodiments, the polymer composite separator further comprises a second liquid solvent that permeates into the separator wherein the second liquid solvent has a higher flash point or lower vapor pressure as compared to the first liquid solvent. Such a second liquid solvent is capable of improving the lithium-ion conductivity and/or flame-retardancy of the composite separator and the battery cell.

The second liquid solvent may be selected from the group consisting of fluoroethylene carbonate, vinyl sulfite, vinyl ethylene sulfite, 1,3-propyl sultone, 1,3,5-trioxane (TXE), 1,3-acrylic-sultones, methyl ethylene sulfone, methyl vinyl sulfone, ethyl vinyl sulfone, methyl methacrylate, vinyl acetate, acrylamide, 1,3-dioxolane (DOL), fluorinated ethers, fluorinated esters, sulfones, sulfides, dinitriles, acrylonitrile (AN), sulfates, siloxanes, silanes, N-methylacetamide, acrylates, ethylene glycols, tetrahydrofuran, combinations thereof, and combinations thereof with phosphates, phosphonates, phosphinates, phosphines, phosphine oxides, phosphonic acids, phosphorous acid, phosphites, phosphoric acids, phosphazene compounds, ionic liquids, derivatives thereof, and mixtures thereof.

The present disclosure also provides a lithium secondary battery comprising a cathode, an anode, and the presently disclosed flame-resistant polymer composite separator, which is disposed between the cathode and the anode.

In certain embodiments, the anode in the lithium secondary battery has an amount of lithium or lithium alloy as an anode active material supported by an anode current collector. In certain other embodiments, initially the anode has no lithium or lithium alloy as an anode active material supported by an anode current collector when the battery is made and prior to a charge or discharge operation of the battery. This latter configuration is referred to as an anode-less lithium battery. The current collector may be a Cu foil, a layer of Ni foam, a porous layer of nano-filaments, such as graphene sheets, carbon nanofibers, carbon nano-tubes, etc. forming a 3D interconnected network of electron-conducting pathways.

We have discovered that this polymer composite separator layer provides several unexpected benefits: (a) the formation and penetration of dendrite can be essentially eliminated; (b) uniform deposition of lithium back to the anode side is readily achieved during battery charging; (c) the layer ensures smooth and uninterrupted transport of lithium ions from/to the anode current collector surface (or the lithium film deposited thereon during the battery operations) and through the interface between the current collector (or the lithium film deposited thereon) and the polymer composite separator layer with minimal interfacial resistance; and (d) cycle stability can be significantly improved and cycle life increased. No additional protective layer for the lithium metal anode is required. The separator itself also plays the role as an anode protective layer.

In a conventional lithium metal cell, as illustrated in FIG. 1, the anode active material (lithium) is deposited in a thin film form or a thin foil form directly onto an anode current collector (e.g., a Cu foil) before this anode and a cathode are combined to form a cell. The battery is a lithium metal battery, lithium sulfur battery, lithium-selenium battery, etc. As previously discussed in the Background section, these lithium secondary batteries have the dendrite-induced internal shorting and "dead lithium" issues at the anode.

We have solved these challenging issues that have troubled battery designers and electrochemists alike for more than 30 years by developing and implementing a new polymer composite separator disposed between the anode (an anode current collector or an anode active material layer) and a cathode active material layer. This polymer composite separator layer has a lithium ion conductivity no less than $10^{-8}$/cm at room temperature (preferably and more typically from $1\times10^{-5}$ S/cm to $5\times10^{-2}$ S/cm).

Figure 2:
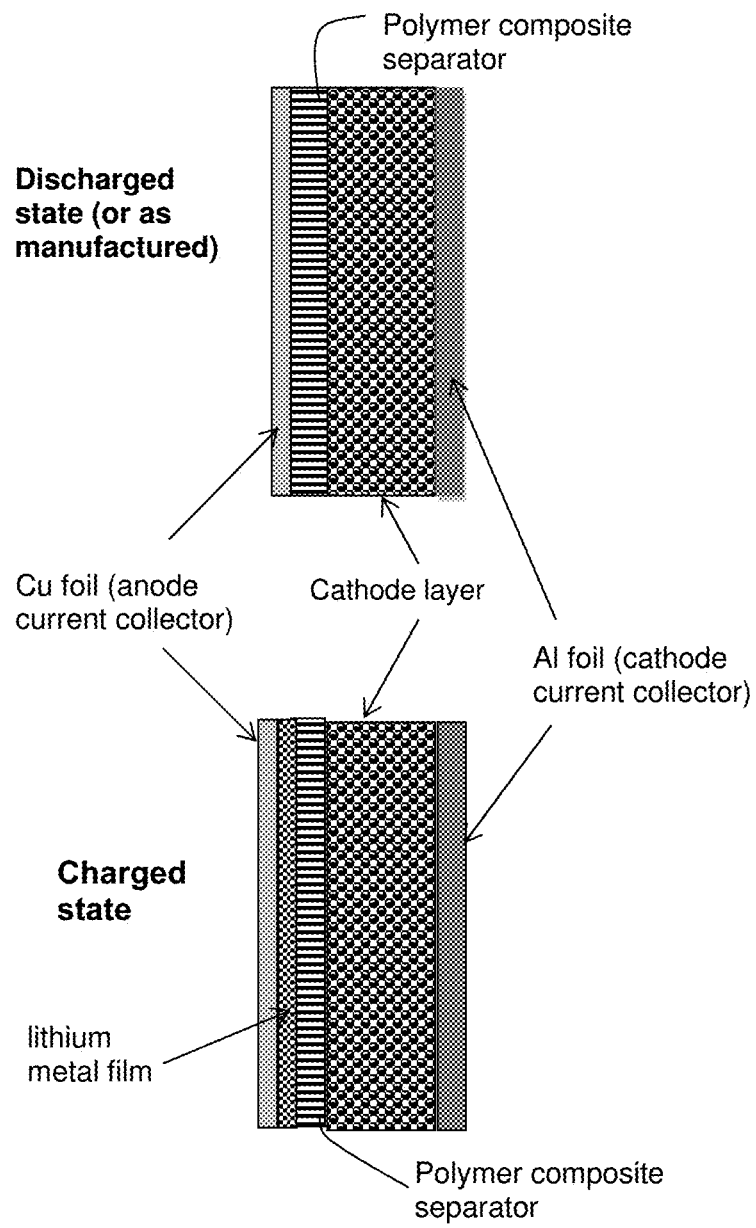
FIG. 2 Schematic of a presently invented lithium metal battery cell (upper diagram) containing an anode current collector (e.g., Cu foil) but no anode active material (when the cell is manufactured or in a fully discharged state), a polymer composite separator, and a cathode active material layer, which is composed of particles of a cathode active material, a conductive additive (not shown) and a resin binder (not shown). A cathode current collector supporting the cathode active layer is also shown. The lower diagram shows a thin lithium metal layer deposited between the Cu foil and the composite separator layer when the battery is in a charged state.

As schematically shown in FIG. 2, one embodiment of the present disclosure is a lithium metal battery cell containing an anode current collector (e.g., Cu foil), an anode-protecting layer, a polymer composite-based separator, and a cathode active material layer. The cathode active material layer is composed of particles of a cathode active material, a conductive additive (not shown) and a resin binder (not shown). A cathode current collector (e.g., Al foil) supporting the cathode active layer is also shown in FIG. 2.

It may be noted that FIG. 2 shows a lithium battery that initially does not contain a lithium foil or lithium coating at the anode (only an anode current collector, such as a Cu foil or a graphene/CNT mat) when the battery is made. The needed lithium to be bounced back and forth between the anode and the cathode is initially stored in the cathode active material (e.g., lithium vanadium oxide $Li_xV_2O_5$, instead of vanadium oxide, $V_2O_5$; or lithium polysulfide, instead of sulfur). During the first charging procedure of the lithium battery (e.g., as part of the electrochemical formation process), lithium comes out of the cathode active material, passes through the elastic composite separator and deposits on the anode current collector. The presence of the presently invented polymer composite separator (in good contact with the current collector) enables the uniform deposition of lithium ions on the anode current collector surface. Such a battery configuration avoids the need to have a layer of lithium foil or coating being present during battery fabrication. Bare lithium metal is highly sensitive to air moisture and oxygen and, thus, is more challenging to handle in a real battery manufacturing environment. This strategy of pre-storing lithium in the lithiated (lithium-containing) cathode active materials, such as $Li_xV_2O_5$ and $Li_2S_x$, makes all the materials safe to handle in a real manufacturing environment. Cathode active materials, such as $Li_xV_2O_5$ and $Li_2S_x$, are typically not air-sensitive.

As the charging procedure continues, more lithium ions get to deposit onto the anode current collector, forming a lithium metal film or coating. During the subsequent discharge procedure, this lithium film or coating layer decreases in thickness due to dissolution of lithium into the electrolyte to become lithium ions, creating a gap between the current collector and the protective layer if the separator layer were not elastic or compliant. Such a gap would make the re-deposition of lithium ions back to the anode impossible during a subsequent recharge procedure. We have observed that a selected polymer composite separator layer is capable of expanding or shrinking congruently or conformably with the anode layer. This capability helps to maintain a good contact between the current collector (or the lithium film subsequently or initially deposited on the current collector surface) and the protective layer, enabling the re-deposition of lithium ions without interruption.

In certain embodiments, inorganic material particles are non-uniformly distributed in the thermally stable polymer matrix in such a manner that a concentration of the inorganic material particles in one region of the polymer matrix is greater than a concentration of the inorganic material particles in another region. For instance, FIG. 3(A) schematically shows a polymer composite separator layer wherein inorganic solid material particles are uniformly dispersed in a matrix of an elastic polymer according to some embodiments of the present disclosure.

According to some other embodiments of the present disclosure, FIG. 3(B) schematically shows a polymer composite separator layer wherein inorganic solid electrolyte particles are preferentially dispersed near one surface (e.g., facing the anode side) of a polymer composite separator layer; the opposing surface has a lower or zero concentration of the inorganic solid electrolyte particles. This latter structure has the advantages that the high-concentration portion, being strong and rigid, provides a lithium dendrite-stopping capability while other portion of the layer remains elastic or compliant to maintain good contacts with neighboring layers (e.g., cathode active material layer containing a solid electrolyte on one side and lithium metal on the other) for reduced interfacial impedance. In some preferred embodiments, this opposing side of the separator contains a second liquid solvent dispersed in the polymer matrix.

FIG. 3(C) schematically shows a polymer composite separator layer wherein the inorganic solid electrolyte particles are disposed at the core of a polymer composite separator layer and the outer regions have a lower or zero concentration of the inorganic solid electrolyte particles, according to some embodiments of the present disclosure. The softer outer regions are more conducive to a good contact between the separator and the anode or the cathode layer, thereby reducing the interfacial impedance.

Alternatively, the core region may have a lower or zero concentration of the inorganic solid electrolyte particles, but one or both outer surface regions have a high concentration (e.g., 60-98% by volume) of the particles. Preferably, the outer surface (intended to be facing the lithium anode layer, for instance) of the polymer composite separator layer has a concentration of the inorganic material particles at least 60% by volume and the core region contains a desired amount of the second liquid solvent.

Preferably, the inorganic solid electrolyte material is in a fine powder form having a particle size preferably from 10 nm to 30 μm (more preferably from 50 nm to 1 μm). The inorganic solid electrolyte material may be selected from an oxide type (e.g., perovskite-type), sulfide type, hydride type, halide type, borate type, phosphate type, lithium phosphorus oxynitride (LiPON), Garnet-type, lithium superionic conductor (LISICON), sodium superionic conductor (NASICON), or a combination thereof.

The inorganic solid electrolytes that can be incorporated into a polymer matrix as an ion-conducting additive to make a separator include, but are not limited to, perovskite-type, NASICON-type, garnet-type and sulfide-type materials. A representative and well-known perovskite solid electrolyte is $Li_{3x}La_{2/3-x}TiO_3$, which exhibits a lithium-ion conductivity exceeding $10^{-3}$ S/cm at room temperature. This material has been deemed unsuitable in lithium batteries because of the reduction of $Ti^{4+}$ on contact with lithium metal. However, we have found that this material, when dispersed in an elastic polymer, does not suffer from this problem.

The sodium superionic conductor (NASICON)-type compounds include a well-known $Na_{1+x}Zr_2Si_xP_{3-x}O_{12}$. These materials generally have an $AM_2(PO_4)_3$ formula with the A site occupied by Li, Na or K. The M site is usually occupied by Ge, Zr or Ti. In particular, the $LiTi_2(PO_4)_3$ system has been widely studied as a solid state electrolyte for the lithium-ion battery. The ionic conductivity of $LiZr_2(PO_4)_3$ is very low, but can be improved by the substitution of Hf or Sn. This can be further enhanced with substitution to form $Li_{1+x}M_xTi_{2-x}(PO_4)_3$ (M=Al, Cr. Ga, Fe, Sc, In, Lu, Y or La), Al substitution has been demonstrated to be the most effective solid state electrolyte. The $Li_{1+x}Al_xGe_{2-x}(PO_4)_3$ system is also an effective solid state due to its relatively wide electrochemical stability window. NASICON-type materials are considered as suitable solid electrolytes for high-voltage solid electrolyte batteries.

Garnet-type materials have the general formula $A_3B_2Si_3O_{12}$, in which the A and B cations have eightfold and sixfold coordination, respectively. In addition to $Li_3M_2Ln_3O_{12}$ (M=W or Te), a braod series of garnet-type materials may be used as an additive, including $Li_5La_3M_2O_{12}$ (M=Nb or Ta), $Li_6ALa_2M_2O_{12}$ (A=Ca, Sr or Ba; M=Nb or Ta), $Li_{5.5}La_3M_{1.75}B_{0.25}O_{12}$ (M=Nb or Ta; B=In or Zr) and the cubic systems $Li_7La_3Zr_2O_{12}$ and $Li_{7.06}M_3Y_{0.06}Zr_{1.94}O_{12}$ (M=La, Nb or Ta). The $Li_{6.5}La_3Zr_{1.75}Te_{0.25}O_{12}$ compounds have a high ionic conductivity of $1.02 \times 10^{-3}$ S/cm at room temperature.

The sulfide-type solid electrolytes include the $Li_2S$—$SiS_2$ system. The highest reported conductivity in this type of material is $6.9 \times 10^{-4}$ S/cm, which was achieved by doping the $Li_2S$—$SiS_2$ system with $Li_3PO_4$. The sulfide type also includes a class of thio-LISICON (lithium superionic conductor) crystalline material represented by the $Li_2S$—$P_2S_5$ system. The chemical stability of the $Li_2S$—$P_2S_5$ system is considered as poor, and the material is sensitive to moisture (generating gaseous $H_2S$). The stability can be improved by the addition of metal oxides. The stability is also significantly improved if the $Li_2S$—$P_2S_5$ material is dispersed in an elastic polymer.

These solid electrolyte particles dispersed in a polymer matrix or bonded together by a polymer binder can help stop the penetration of lithium dendrites (if present) and enhance the lithium-ion conductivity of certain polymers having an intrinsically low ion conductivity.

Preferably and typically, the disclosed binder/matrix polymer has a lithium-ion conductivity no less than $10^{-5}$ S/cm, more preferably no less than $10^{-4}$ S/cm, further preferably no less than $10^{-3}$ S/cm, and most preferably no less than $10^{-2}$ S/cm. Preferably, the composite separator is a polymer matrix composite containing from 1% to 99% (preferably 30% to 95% and most preferably 60% to 90%) by weight of lithium ion-conducting solid electrolyte particles dispersed in or bonded by a polymer matrix material.

Typically, a selected matrix/binder polymer is originally in a monomer or oligomer state that can be polymerized into a linear or branched polymer or cured to form a cross-linked polymer. Alternatively, prior to curing, the polymers or oligomers are soluble in an organic solvent to form a polymer solution. An ion-conducting additive may be added to this solution to form a suspension. This solution or suspension can then be formed into a thin layer of polymer precursor on a surface of an anode current collector or a solid substrate surface. The polymer precursor (e.g., monomer and initiator or oligomer and a crosslinker, etc.) is then polymerized and/or cured to form a cross-linked polymer. This thin layer of polymer may be tentatively deposited on a solid substrate (e.g., surface of a polymer or glass), dried, and separated from the substrate to become a free-standing polymer layer. This free-standing layer is then laid on a lithium foil/coating or implemented between an anode layer (e.g., a Si-based anode active material layer or a lithium film/coating) and a cathode layer. Polymer layer formation can be accomplished by using one of several procedures well-known in the art; e.g., spraying, spray-painting, printing, coating, extrusion-based film-forming, casting, etc.

In the conventional lithium-ion battery or lithium metal battery industry, the liquid solvents listed above as choices of the first liquid solvent are commonly used as a solvent to dissolve a lithium salt therein and the resulting solutions are used as a liquid electrolyte. These liquid solvents typically have a relatively high dielectric constant and are capable of dissolving a high amount of a lithium salt; however, they are typically highly volatile, having a low flash point and being highly flammable. Further, these liquid solvents are generally not known to be polymerizable, with or without the presence of a second liquid solvent, and a separate or different polymer or monomer is typically used in the industry to prepare a gel polymer electrolyte or solid polymer electrolyte.

It is highly advantageous to be able to polymerize the liquid solvent once the liquid electrolyte (having a lithium salt dissolved in the first liquid solvent) is injected into a battery cell or into the separator layer backbone structure (e.g., a woven or nonwoven fabric containing polymeric, glass, and/or ceramic fibers). With such an innovative strategy, one can readily reduce the liquid solvent amount or completely eliminate the volatile liquid solvent all together. A desired amount of a second liquid solvent, preferably a flame-resistant liquid solvent, may be retained in the battery cell to improve the lithium-ion conductivity of the electrolyte. Desirable flame retardant-type second liquid solvents are, as examples, alkyl phosphates, alkyl phosphonates, phosphazenes, hydrofluoroethers, fluorinated ethers, and fluorinated esters.

This strategy enables us to achieve several desirable features of the resultant electrolytes and batteries:
a) no liquid electrolyte leakage issue (the in situ cured polymer being capable of holding the remaining liquid together to form a gel);
b) adequate lithium salt amount can be dissolved in the electrolyte, enabling a good lithium ion conductivity;
c) reduced or eliminated flammability (only a solid polymer and, optionally, a non-flammable second liquid are retained in the cell);
d) good ability of the electrolyte to wet the anode/cathode active material surfaces (hence, significantly reduced interfacial impedance and internal resistance);
e) processing ease and compatibility with current lithium-ion battery production processes and equipment, etc.; and
f) enabling a high cathode active material proportion in the cathode electrode (typically 75-97%, in contrast to typically less than 75% by weight of the cathode active material when working with a conventional solid polymer electrolyte or inorganic solid electrolyte.

This disclosed in situ-cured polymer electrolyte approach is of significant utility value since most of the organic solvents in the lithium-ion cell electrolytes are known to be volatile and flammable, posing a fire and explosion danger. Further, current solid-state electrolytes are not compatible with existing lithium-ion battery manufacturing equipment and processes.

In certain preferred embodiments, the second liquid solvent comprises a flame-resisting or flame-retardant liquid selected from an organic phosphorus compound, an inorganic phosphorus compound, a halogenated derivative thereof, or a combination thereof. The organic phosphorus compound or the inorganic phosphorus compound preferably is selected from the group consisting of phosphates, phosphonates, phosphonic acids, phosphorous acids, phosphites, phosphoric acids, phosphinates, phosphines, phosphine oxides, phosphazene compounds, derivatives thereof, and combinations thereof.

Thus, in certain embodiments, the second liquid solvent is selected from the group consisting of fluorinated ethers, fluorinated esters, sulfones, sulfides, nitriles, sulfates, siloxanes, silanes, phosphates, phosphonates, phosphinates, phosphines, phosphine oxides, phosphonic acids, phosphorous acid, phosphites, phosphoric acids, phosphazene compounds, derivatives thereof, and combinations thereof.

In some embodiments, the second liquid solvent is selected from a phosphate, phosphonate, phosphinate, phosphine, or phosphine oxide having the structure of:

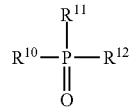

(Chemical Formula 1A)

wherein $R^{10}$, $R^{11}$, and $R^{12}$, are independently selected from the group consisting of alkyl, aryl, heteroalkyl, heteroaryl, halogen substituted alkyl, halogen substituted aryl, halogen substituted heteroalkyl, halogen substituted heteroaryl, alkoxy, aryloxy, heteroalkoxy, heteroaryloxy, halogen substituted alkoxy, halogen substituted aryloxy, halogen substituted heteroalkoxy, and halogen substituted heteroaryloxy functional groups, and the second liquid solvent is stable under an applied electrical potential no less than 4 V.

In some embodiments, the second liquid solvent comprises a phosphoranamine having the structure of:

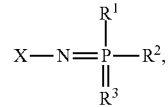

(Chemical Formula 1B)

wherein $R^1$, $R^2$, and $R^3$ are independently selected from the group consisting of alkyl, aryl, heteroalkyl, heteroaryl, halogen substituted alkyl, halogen substituted aryl, halogen substituted heteroalkyl, halogen substituted heteroaryl, alkoxy, aryloxy, heteroalkoxy, heteroaryloxy, halogen substituted alkoxy, halogen substituted aryloxy, halogen substituted heteroalkoxy, and halogen substituted heteroaryloxy functional groups, wherein $R^1$, $R^2$, and $R^3$ are represented by at least two different substituents and wherein X is selected from the group consisting of an organosiylyl group or a tert-butyl group. The $R^1$, $R^2$, and $R^3$ may be each independently selected from the group consisting of an alkoxy group, and an aryloxy group.

The cathode may contain a cathode active material (along with an optional conductive additive and an optional resin binder) and an optional cathode current collector (such as Al foil) supporting the cathode active material. The anode may have an anode current collector, with or without an anode active material in the beginning when the cell is made. It may be noted that if no conventional anode active material, such as graphite, Si, SiO, Sn, and conversion-type anode materials, and no lithium metal is present in the cell when the cell is made and before the cell begins to charge and discharge, the battery cell is commonly referred to as an "anode-less" lithium cell.

It may be noted that these first liquid solvents herein disclosed, upon polymerization, become essentially non-flammable. These liquid solvents were typically known to be useful for dissolving a lithium salt and not known for their polymerizability or their potential as an electrolyte polymer.

In some preferred embodiments, the battery cell contains substantially no volatile liquid solvent therein after polymerization. However, it is essential to initially include a liquid solvent in the cell, enabling the lithium salt to get dissociated into lithium ions and anions. A majority (>50%, preferably >70%) or substantially all of the unpolymerized first liquid solvent (particularly the organic solvent) is then removed just before or after curing of the reactive additive. With substantially 0% liquid solvent, the resulting electrolyte is a solid-state electrolyte. With less than 30% liquid solvent, we have a quasi-solid electrolyte. Both are highly flame-resistant.

In certain embodiments, the electrolyte exhibits a vapor pressure less than 0.001 kPa when measured at 20° C., a vapor pressure less than 60% of the vapor pressure of the combined first liquid solvent and lithium salt alone prior to polymerization, a flash point at least 100 degrees Celsius higher than a flash point of the liquid solvent prior to polymerization, a flash point higher than 200° C., or no measurable flash point and wherein the polymer has a lithium ion conductivity from $10^{-8}$ S/cm to $10^{-2}$ S/cm at room temperature.

A lower proportion of the unpolymerized liquid solvent in the electrolyte leads to a significantly reduced vapor pressure and increased flash point or completely eliminated flash point (un-detectable). Although typically by reducing the liquid solvent proportion one tends to observe a reduced lithium-ion conductivity for the resulting electrolyte; however, quite surprisingly, after a threshold liquid solvent fraction, this trend is diminished or reversed (the lithium-ion conductivity can actually increase with reduced liquid solvent in some cases).

In certain embodiments, the reactive additive comprises a first polymerizable liquid solvent and a second liquid solvent and wherein the second liquid solvent either is not polymerizable or is polymerizable but polymerized to a lesser extent as compared to the first polymerizable liquid solvent. The presence of this second liquid solvent is designed to impart certain desired properties to the polymerized electrolyte, such as lithium-ion conductivity, flame retardancy, ability of the electrolyte to permeate into the electrode (anode and/or cathode) to properly wet the surfaces of the anode active material and/or the cathode active material.

In some embodiments, the second liquid solvent is selected from a fluorinated carbonate, hydrofluoroether, fluorinated ester, sulfone, nitrile, phosphate, phosphite, alkyl phosphonate, phosphazene, sulfate, siloxane, silane, 1,3-dioxolane (DOL), 1,2-dimethoxyethane (DME), tetraethylene glycol dimethylether (TEGDME), poly(ethylene glycol) dimethyl ether (PEGDME), diethylene glycol dibutyl ether (DEGDBE), 2-ethoxyethyl ether (EEE), sulfone, sulfolane, ethylene carbonate (EC), dimethyl carbonate (DMC), methylethyl carbonate (MEC), diethyl carbonate (DEC), ethyl propionate, methyl propionate, propylene carbonate (PC), gamma.-butyrolactone (Y-BL), acetonitrile (AN), ethyl acetate (EA), propyl formate (PF), methyl formate (MF), toluene, xylene, methyl acetate (MA), fluoroethylene carbonate (FEC), vinylene carbonate (VC), allyl ethyl carbonate (AEC), or a combination thereof.

Desirable polymerizable liquid solvents can include fluorinated monomers having unsaturation (double bonds or triple bonds) in the backbone or cyclic structure (e.g., fluorinated vinyl carbonates, fluorinated vinyl monomers, fluorinated esters, fluorinated vinyl esters, and fluorinated vinyl ethers). These chemical species may also be used as a second liquid solvent in the presently disclosed electrolyte. Fluorinated vinyl esters include $R_fCO_2CH=CH_2$ and Propenyl Ketones, $R_fCOCH=CHCH_3$, where Rr is F or any F-containing functional group (e.g., $CF_2$— and $CF_2CF_3$—).

Two examples of fluorinated vinyl carbonates are given below:

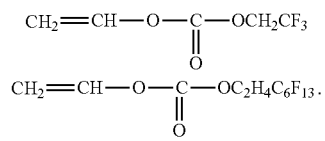

These liquid solvents, as a monomer, can be cured in the presence of an initiator (e.g., 2-Hydroxy-2-methyl-1-phenyl-propan-1-one, Ciba DAROCUR-1173, which can be activated by UV or electron beam):

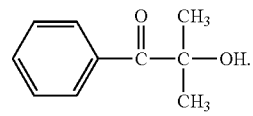

In some embodiments, the fluorinated carbonate is selected from vinyl- or double bond-containing variants of fluoroethylene carbonate (FEC), DFDMEC, FNPEC, hydrofluoro ether (HFE), trifluoro propylene carbonate (FPC), or methyl nonafluorobutyl ether (MFE), wherein the chemical formulae for FEC, DFDMEC, and FNPEC, respectively are shown below:

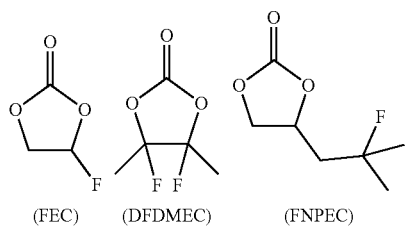

Desirable sulfones as a polymerizable first liquid solvent or as a second liquid solvent include, but not limited to, alkyl and aryl vinyl sulfones or sulfides; e.g., ethyl vinyl sulfide, allyl methyl sulfide, phenyl vinyl sulfide, phenyl vinyl sulfoxide, ethyl vinyl sulfone, allyl phenyl sulfone, allyl methyl sulfone, and divinyl sulfone.

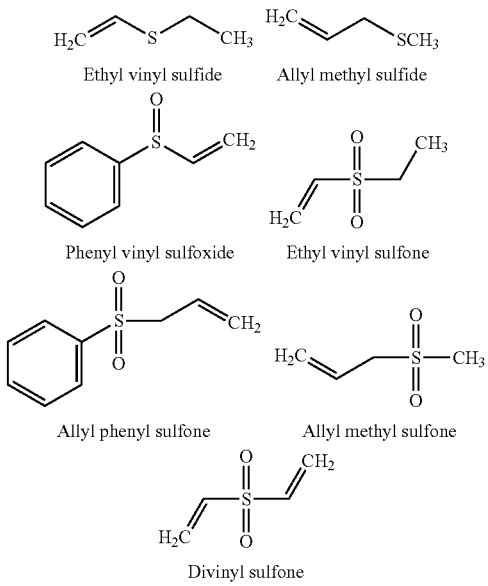

Ethyl vinyl sulfide, Allyl methyl sulfide, Phenyl vinyl sulfoxide, Ethyl vinyl sulfone, Allyl phenyl sulfone, Allyl methyl sulfone, Divinyl sulfone Simple alkyl vinyl sulfones, such as ethyl vinyl sulfone, may be polymerized via emulsion and bulk methods. Propyl vinyl sulfone may be polymerized by alkaline persulfate initiators to form soft polymers. It may be noted that aryl vinyl sulfone, e.g., naphthyl vinyl sulfone, phenyl vinyl sulfone, and parra-substituted phenyl vinyl sulfone (R=NH$_2$, NO$_2$ or Br), were reported to be unpolymerizable with free-radical initiators. However, we have observed that phenyl and methyl vinyl sulfones can be polymerized with several anionic-type initiators. Effective anionic-type catalysts or initiators are n-BuLi, ZnEt$_2$, LiN(CH$_2$)$_2$, NaNH$_2$, and complexes of n-LiBu with ZnEt$_2$ or AlEh. A second solvent, such as pyridine, sulfolane, toluene or benzene, can be used to dissolve alkyl vinyl sulfones, aryl vinyl sulfones, and other larger sulfone molecules.

In certain embodiments, the sulfone is selected from TrMS, MTrMS, TMS, or vinyl or double bond-containing variants of TrMS, MTrMS, TMS, EMS, MMES, EMES, EMEES, or a combination thereof; their chemical formulae being given below:

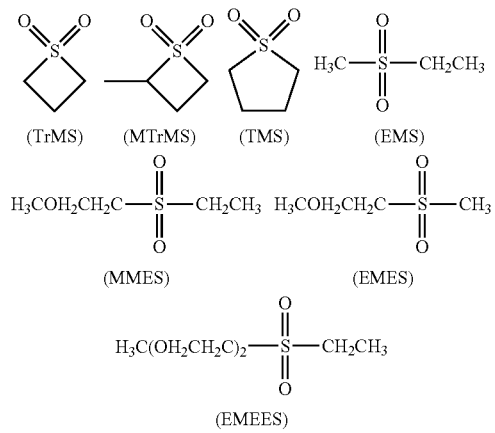

(TrMS), (MTrMS), (TMS), (EMS), (MMES), (EMES), (EMEES)

The cyclic structure, such as TrMS, MTrMS, and TMS, can be polymerized via ring-opening polymerization with the assistance of an ionic type initiator.

The nitrile may be selected from AND, GLN, SEN, or a combination thereof and their chemical formulae are given below:

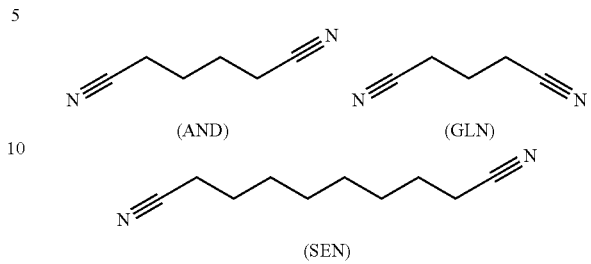

(AND), (GLN), (SEN)

In some embodiments, the phosphate (including various derivatives of phosphoric acid), alkyl phosphonate, phosphazene, phosphite, or sulfate is selected from tris(trimethylsilyl) phosphite (TTSPi), alkyl phosphate, triallyl phosphate (TAP), ethylene sulfate (DTD), a combination thereof, or a combination with 1,3-propane sultone (PS) or propene sultone (PES). The phosphate, alkyl phosphonate, or phosphazene may be selected from the following:

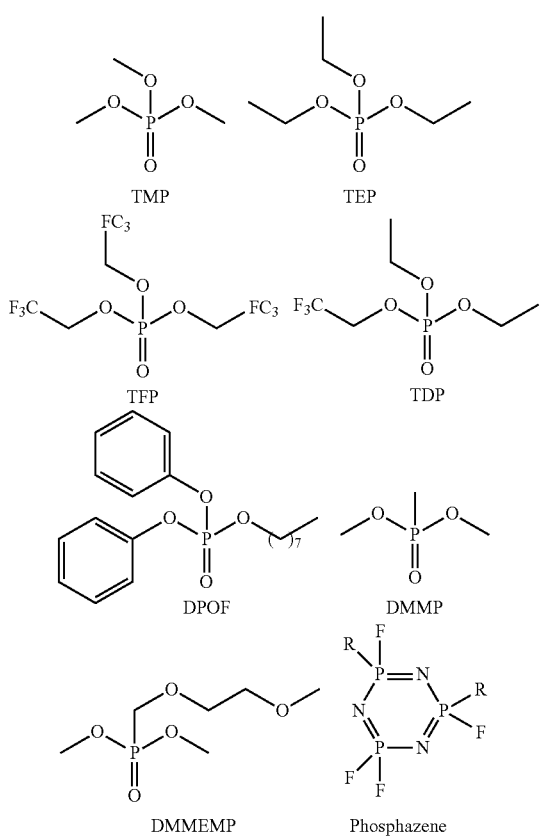

TMP, TEP, TFP, TDP, DPOF, DMMP, DMMEMP, Phosphazene wherein R=H, NH$_2$, or C$_1$-C$_6$ alkyl.

Phosphonate moieties can be readily introduced into vinyl monomers to produce allyl-type, vinyl-type, styrenic-type and (meth)acrylic-type monomers bearing phosphonate groups (e.g., either mono or bisphosphonate). These liquid solvents may serve as a first or a second liquid solvent in the electrolyte composition. The phosphate, alkyl phosphonate, phosphonic acid, and phosphazene, upon polymerization, are found to be essentially non-flammable. Good examples include diethyl vinylphosphonate demethyl vinylphosphonate, vinylphosphonic acid, diethyl allyl phosphate, and diethyl allylphosphonate:

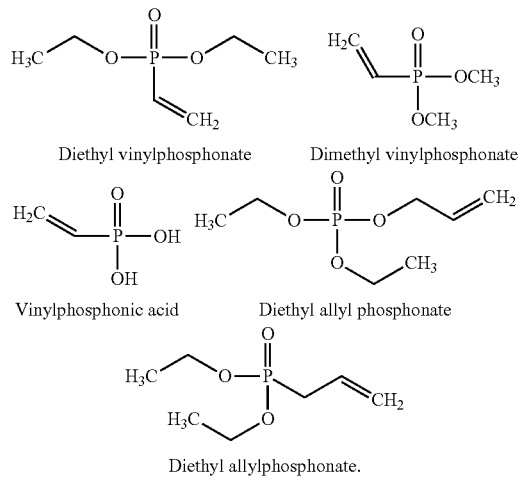

Examples of initiator compounds that can be used in the polymerization of vinylphosphonic acid are peroxides such as benzoyl peroxide, toluy peroxide, di-tert.butyl peroxide, chloro benzoyl peroxide, or hydroperoxides such as methylethyl ketone peroxide, tert, butyl hydroperoxide, cumene hydroperoxide, hydrogen Superoxide, or azo-bis-iso-butyro nitrile, or sulfinic acids such as p-methoxyphenyl-sulfinic acid, isoamyl-sulfinic acid, benzene-sulfinic acid, or combinations of various of such catalysts with one another and/or combinations for example, with formaldehyde sodium sulfoxylate or with alkali metal sulfites.

The siloxane or silane may be selected from alkylsiloxane (Si—O), alkyylsilane (Si—C), liquid oligomeric silaxane (—Si—O—Si—), or a combination thereof.

The reactive additive may further comprise an amide group selected from N,N-dimethylacetamide, N,N-diethylacetamide, N,N-dimethylformamide, N,N-diethylformamide, or a combination thereof.

In certain embodiments, the crosslinking agent comprises a compound having at least one reactive group selected from a hydroxyl group, an amino group, an imino group, an amide group, an acrylic amide group, an amine group, an acrylic group, an acrylic ester group, or a mercapto group in the molecule.

In certain embodiments, the crosslinking agent is selected from poly(diethanol) diacrylate, poly(ethyleneglycol)dimethacrylate, poly(diethanol) dimethylacrylate, poly(ethylene glycol) diacrylate, lithium hexafluorophosphate (LiPF$_6$), lithium borofluoride (LiBF$_4$), lithium hexafluoroarsenide (LiAsF$_6$), lithium trifluoro-methanesulfonate (LiCF$_3$SO$_3$), bis-trifluoromethyl sulfonylimide lithium (LiN(CF$_3$SO$_2$)$_2$), lithium bis(oxalato)borate (LiBOB), lithium oxalyldifluoroborate (LiBF$_2$C$_2$O$_4$), lithium oxalyldifluoroborate (LiBF$_2$C$_2$O$_4$), or a combination thereof.

The initiator may be selected from an azo compound (e.g., azodiisobutyronitrile, AIBN), azobisisobutyronitrile, azobisisoheptonitrile, dimethyl azobisisobutyrate, benzoyl peroxide tert-butyl peroxide and methyl ethyl ketone peroxide, benzoyl peroxide (BPO), bis(4-tert-butylcyclohexyl)peroxydicarbonate, t-amyl peroxypivalate, 2,2'-azobis-(2,4-dimethylvaleronitrile), 2,2'-azobis-(2-methylbutyronitrile), 1,1-azobis(cyclohexane-1-carbonitrile, benzoylperoxide (BPO), hydrogen peroxide, dodecamoyl peroxide, isobutyryl peroxide, cumene hydroperoxide, tert-butyl peroxypivalate, diisopropyl peroxydicarbonate, or a combination thereof.

The crosslinking agent may comprise a compound having at least one reactive group selected from a hydroxyl group, an amino group, an imino group, an amide group, an amine group, an acrylic group, or a mercapto group in the molecule. The amine group is preferably selected from Chemical Formula 2:

(Chemical Formula 2)

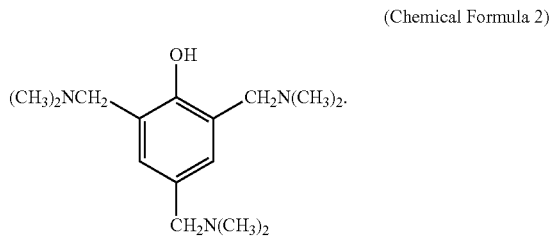

In the rechargeable lithium battery, the reactive additive (to be cured into a polymer) may further comprise a chemical species represented by Chemical Formula 3 or a derivative thereof and the crosslinking agent comprises a chemical species represented by Chemical Formula 4 or a derivative thereof:

(Chemical Formula 3)

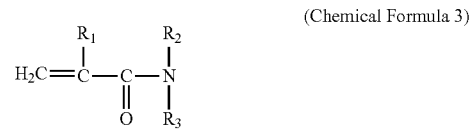

(Chemical Formula 4)

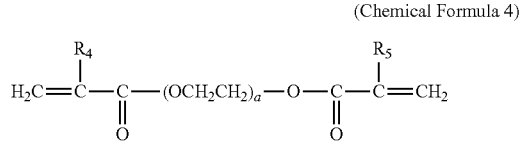

where R$_1$ is hydrogen or methyl group, and R$_2$ and R$_3$ are each independently one selected from the group consisting of hydrogen, methyl, ethyl, propyl, diallylaminopropyl (—C$_3$H$_6$N(R')$_2$) and hydroxyethyl (CH$_2$ CH$_2$ OH) groups, and R$_4$ and R$_5$ are each independently hydrogen or methyl group, and n is an integer from 3 to 30, wherein R' is C$_1$-C$_5$ alkyl group.

Examples of suitable vinyl monomers having Chemical formula 3 include acrylamide, N,N-dimethylacrylamide, N,N-diethylacrylamide, N-isopropylacrylamide, N,N-dimethylamino-propylacrylamide, and N-acryloylmorpholine. Among these species, N-isopropylacrylamide and N-acryloylmorpholine are preferred.

The crosslinking agent is preferably selected from N,N-methylene bisacrylamide, epichlorohydrin, 1,4-butanediol diglycidyl ether, tetrabutylammonium hydroxide, cinnamic acid, ferric chloride, aluminum sulfate octadecahydrate, diepoxy, dicarboxylic acid compound, poly(potassium 1-hydroxy acrylate) (PKHA), glycerol diglycidyl ether (GDE), ethylene glycol, polyethylene glycol, polyethylene glycol diglycidyl ether (PEGDE), citric acid (Formula 4 below), acrylic acid, methacrylic acid, a derivative compound of acrylic acid, a derivative compound of methacrylic acid (e.g, polyhydroxyethylmethacrylate), glycidyl functions, N,N'-

Methylenebisacrylamide (MBAAm), Ethylene glycol dimethacrylate (EGDMAAm), isobornyl methacrylate, poly(acrylic acid) (PAA), methyl methacrylate, isobornyl acrylate, ethyl methacrylate, isobutyl methacrylate, n-Butyl methacrylate, ethyl acrylate, 2-Ethyl hexyl acrylate, n-Butyl acrylate, a diisocyanate (e.g. methylene diphenyl diisocyanate, MDI), an urethane chain, a chemical derivative thereof, or a combination thereof.

Preferably, the lithium salt occupies 0.1%-30% by weight and the crosslinking agent and/or initiator occupies 0.1-50% by weight of the reactive polymer precursor.

It may be advantageous for these materials to form a lightly cross-linked network of polymer chains. In other words, the network polymer or cross-linked polymer should have a relatively low degree of cross-linking or low cross-link density to impart a high elastic deformation. The polymer may contain a simultaneous interpenetrating network (SIN) polymer, wherein two cross-linking chains intertwine with each other, or a semi-interpenetrating network polymer (semi-IPN), which contains a cross-linked polymer and a linear polymer.

The aforementioned polymer can be mixed with a broad array of elastomers, lithium ion-conducting materials, and/or strengthening materials (e.g., glass fibers, ceramic fibers or particles, polymer fibers, such as aramid fibers).

A broad array of elastomers can be mixed with a thermally stable polymer to form a blend, co-polymer, or interpenetrating network that serves to bond the inorganic solid particles together as a separator layer. The elastomeric material may be selected from natural polyisoprene (e.g. cis-1,4-polyisoprene natural rubber (NR) and trans-1,4-polyisoprene gutta-percha), synthetic polyisoprene (IR for isoprene rubber), polybutadiene (BR for butadiene rubber), chloroprene rubber (CR), polychloroprene (e.g. Neoprene, Baypren etc.), butyl rubber (copolymer of isobutylene and isoprene, IIR), including halogenated butyl rubbers (chloro butyl rubber (CUR) and bromo butyl rubber (BUR), styrene-butadiene rubber (copolymer of styrene and butadiene, SBR), nitrile rubber (copolymer of butadiene and acrylonitrile, NBR), EPM (ethylene propylene rubber, a copolymer of ethylene and propylene), EPDM rubber (ethylene propylene diene rubber, a terpolymer of ethylene, propylene and a diene-component), epichlorohydrin rubber (ECO), polyacrylic rubber (ACM, ABR), silicone rubber (SI, Q, VMQ), fluorosilicone rubber (FVMQ), fluoroelastomers (FKM, and FEPM; such as Viton, Tecnoflon, Fluorel, Aflas and Dai-El), perfluoroelastomers (FFKM: Tecnoflon PFR, Kalrez, Chemraz, Perlast), polyether block amides (PEBA), chlorosulfonated polyethylene (CSM; e.g. Hypalon), and ethylene-vinyl acetate (EVA), thermoplastic elastomers (TPE), protein resilin, protein elastin, ethylene oxide-epichlorohydrin copolymer, polyurethane, urethane-urea copolymer, and combinations thereof.

The urethane-urea copolymer film usually consists of two types of domains, soft domains and hard ones. Entangled linear backbone chains consisting of poly (tetramethylene ether) glycol (PTMEG) units constitute the soft domains, while repeated methylene diphenyl diisocyanate (MDI) and ethylene diamine (EDA) units constitute the hard domains. The lithium ion-conducting additive can be incorporated in the soft domains or other more amorphous zones.

The presently invented lithium secondary batteries can contain a wide variety of cathode active materials. The cathode active material layer may contain a cathode active material selected from an inorganic material, an organic material, a polymeric material, or a combination thereof.

The inorganic material may be selected from a metal oxide, metal phosphate, metal silicide, metal selenide, transition metal sulfide, sulfur, lithium polysulfide, selenium, lithium selenide, or a combination thereof.

The inorganic material may be selected from a lithium cobalt oxide, lithium nickel oxide, lithium manganese oxide, lithium vanadium oxide, lithium-mixed metal oxide, lithium iron phosphate, lithium manganese phosphate, lithium vanadium phosphate, lithium mixed metal phosphate, lithium metal silicide, or a combination thereof.

The inorganic material may be selected from a lithium transition metal silicate, denoted as $Li_2MSiO_4$ or $Li_2Ma_xMb_ySiO_4$, wherein M and Ma are selected from Fe, Mn, Co, Ni, or V, Mb is selected from Fe, Mn, Co, Ni, V, Ti, Al, B, Sn, or Bi; and $x+y \leq 1$.

Examples of the lithium transition metal oxide- or lithium mixed transition metal oxide-based positive active materials include: $Li(M'_xM''_y)O_2$, where M' and M'' are different metals (e.g., $Li(Ni_xMn_y)O_2$, $Li(Ni_{1/2}Mn_{1/2})O_2$, $Li(Cr_xMn_{1-x})O_2$, $Li(Al_xMn_{1-x})O_2$), $Li(Co_xM_{1-x})O_2$, where M is a metal, (e.g. $Li(Co_xNi_{1-x})O_2$ and $Li(Co_xFe_{1-x})O_2$), $Li_{1-w}(Mn_xNi_yCo_z)O_2$, (e.g. $Li(Co_xMn_yNi_{(1-x-y)})O_2$, $Li(Mn_{1/3}Ni_{1/3}Co_{1/3})O_2$, $Li(Mn_{1/3}Ni_{1/3}Co_{1/3-x}Mg_x)O_2$, $Li(Mn_{0.4}Ni_{0.4}Co_{0.2})O_2$, $Li(Mn_{0.1}Ni_{0.1}Co_{0.8})O_2$), $Li_{1-w}(Mn_xNi_xCo_{1-2x})O_2$, $Li_{1-w}Mn_xNi_yCoAl_w)O_2$, $Li_{1-w}(Ni_xCo_yAl_z)O_2$, where W=0-1, (e.g., $Li(Ni_{0.8}Co_{0.15}Al_{0.05})O_2$), $Li_{1-w}(Ni_xCo_yM_z)O_2$, where M is a metal, $Li_{1-w}(Ni_xMn_yM_z)O_2$, where M is a metal, $Li(Ni_xMn_yCr_{2-x})O_4$, $LiM'M''_2O_4$, where M' and M'' are different metals (e.g., $LiMn_{2-y-z}Ni_yO_4$, $LiMn_{2-y-z}Ni_yLi_zO_4$, $LiMn_{1.5}Ni_{0.5}O_4$, $LiNiCuO_4$, $LiMn_{1-x}Al_xO_4$, $LiNi_{0.5}Ti_{0.5}O_4$, $Li_{1.05}Al_{0.1}Mn_{1.85}O_{4-z}F_z$, $Li_2MnO_3$) $Li_xV_yO_z$, e.g. $LiV_3O_8$, $LiV_2O_5$, and $LiV_6O_{13}$. This list includes the well-known lithium nickel cobalt manganese oxides (NCM) and lithium nickel cobalt manganese aluminum oxides (NCM), among others.

The metal oxide contains a vanadium oxide selected from the group consisting of $VO_2$, $Li_xVO_2$, $V_2O_5$, $Li_xV_2O_5$, $V_3O_8$, $Li_xV_3O_8$, $Li_xV_3O_7$, $V_4O_9$, $Li_xV_4O_9$, $V_6O_{13}$, $Li_xV_6O_{13}$, their doped versions, their derivatives, and combinations thereof, wherein $0.1 < x < 5$.

In certain desired embodiments, the inorganic cathode active material is selected from a lithium-free cathode material. Such an initially lithium-free cathode may contain a metal fluoride or metal chloride including the group consisting of $CoF_3$, $MnF_3$, $FeF_3$, $VF_3$, $VOF_3$, $TiF_3$, $BiF_3$, $NiF_2$, $FeF_2$, $CuF_2$, $CuF$, $SnF_2$, $AgF$, $CuCl_2$, $FeCl_3$, $MnCl_2$, and combinations thereof. In these cases, it is particularly desirable to have the anode active material prelithiated to a high level, preferably no less than 50%. In some preferred embodiments, prelithiated anode comprises Si that is prelithiated to approximately 60-100% and the cathode comprises a cathode active material that is initially lithium-free.

The inorganic cathode active material may be selected from: (a) bismuth selenide or bismuth telluride, (b) transition metal dichalcogenide or trichalcogenide, (c) sulfide, selenide, or telluride of niobium, zirconium, molybdenum, hafnium, tantalum, tungsten, titanium, cobalt, manganese, iron, nickel, or a transition metal; (d) boron nitride, or (e) a combination thereof.

The inorganic material may be selected from a transition metal dichalcogenide, a transition metal trichalcogenide, or a combination thereof. The inorganic material may be selected from $TiS_2$, $TaS_2$, $MoS_2$, $NbSe_3$, $MnO_2$, $CoO_2$, an iron oxide, a vanadium oxide, or a combination thereof.

The metal oxide or metal phosphate may be selected from a layered compound $LiMO_2$, spinel compound $LiM_2O_4$, olivine compound LiMPO$_4$, silicate compound Li$_2$MSiO$_4$, Tavorite compound LiMPO$_4$F, borate compound LiMBO$_3$, or a combination thereof, wherein M is a transition metal or a mixture of multiple transition metals.

The organic material or polymeric material may be selected from Poly(anthraquinonyl sulfide) (PAQS), a lithium oxocarbon, 3,4,9,10-perylenetetracarboxylic dianhydride (PTCDA), poly(anthraquinonyl sulfide), pyrene-4,5,9,10-tetraone (PYT), polymer-bound PYT, Quino(triazene), redox-active organic material, Tetracyanoquinodimethane (TCNQ), tetracyanoethylene (TCNE), 2,3,6,7,10,11-hexamethoxytriphenylene (HMTP), poly(5-amino-1,4-dyhydroxy anthraquinone) (PADAQ), phosphazene disulfide polymer ([(NPS$_2$)$_3$]n), lithiated 1,4,5,8-naphthalenetetraol formaldehyde polymer, Hexaazatrinaphtylene (HATN), Hexaazatriphenylene hexacarbonitrile (HAT(CN)$_6$), 5-Benzylidene hydantoin, Isatine lithium salt, Pyromellitic diimide lithium salt, tetrahydroxy-p-benzoquinone derivatives (THQLi$_4$), N,N'-diphenyl-2,3,5,6-tetraketopiperazine (PHP), N,N'-diallyl-2,3,5,6-tetraketopiperazine (AP), N,N'-dipropyl-2,3,5,6-tetraketopiperazine (PRP), a thioether polymer, a quinone compound, 1,4-benzoquinone, 5,7,12,14-pentacenetetrone (PT), 5-amino-2,3-dihydro-1,4-dyhydroxy anthraquinone (ADDAQ), 5-amino-1,4-dyhydroxy anthraquinone (ADAQ), calixquinone, Li$_4$C$_6$O$_6$, Li$_2$C$_6$O$_6$, Li$_6$C$_6$O$_6$, or a combination thereof.

The thioether polymer is selected from Poly[methanetetryl-tetra(thiomethylene)](PMTTM), Poly(2,4-dithiopentanylene) (PDTP), a polymer containing Poly(ethene-1,1,2,2-tetrathiol) (PETT) as a main-chain thioether polymers, a side-chain thioether polymer having a main-chain consisting of conjugating aromatic moieties, and having a thioether side chain as a pendant, Poly(2-phenyl-1,3-dithiolane) (PPDT), Poly(1,4-di(1,3-dithiolan-2-yl)benzene) (PDDTB), poly(tetrahydrobenzodithiophene) (PTHBDT), poly[1,2,4,5-tetrakis(propylthio)benzene] (PTKPTB, or poly[3,4(ethylenedithio)thiophene] (PEDTT).

The organic material may contain a phthalocyanine compound selected from copper phthalocyanine, zinc phthalocyanine, tin phthalocyanine, iron phthalocyanine, lead phthalocyanine, nickel phthalocyanine, vanadyl phthalocyanine, fluorochromium phthalocyanine, magnesium phthalocyanine, manganous phthalocyanine, dilithium phthalocyanine, aluminum phthalocyanine chloride, cadmium phthalocyanine, chlorogallium phthalocyanine, cobalt phthalocyanine, silver phthalocyanine, a metal-free phthalocyanine, a chemical derivative thereof, or a combination thereof.

The working electrolyte used in the lithium battery may be a liquid electrolyte, polymer gel electrolyte, solid-state electrolyte (including solid polymer electrolyte, inorganic electrolyte, and composite electrolyte), quasi-solid electrolyte, ionic liquid electrolyte. The liquid electrolyte or polymer gel electrolyte typically comprises a lithium salt dissolved in an organic solvent or ionic liquid solvent. There is no particular restriction on the types of lithium salt or solvent that can be used in practicing the present inventions.

There are a wide variety of processes that can be used to produce layers of polymer composite separators. These include coating, casting, painting, spraying (e.g., ultrasonic spraying), spray coating, printing (screen printing, 3D printing, etc.), tape casting, extrusion, etc.

Figure 5A:
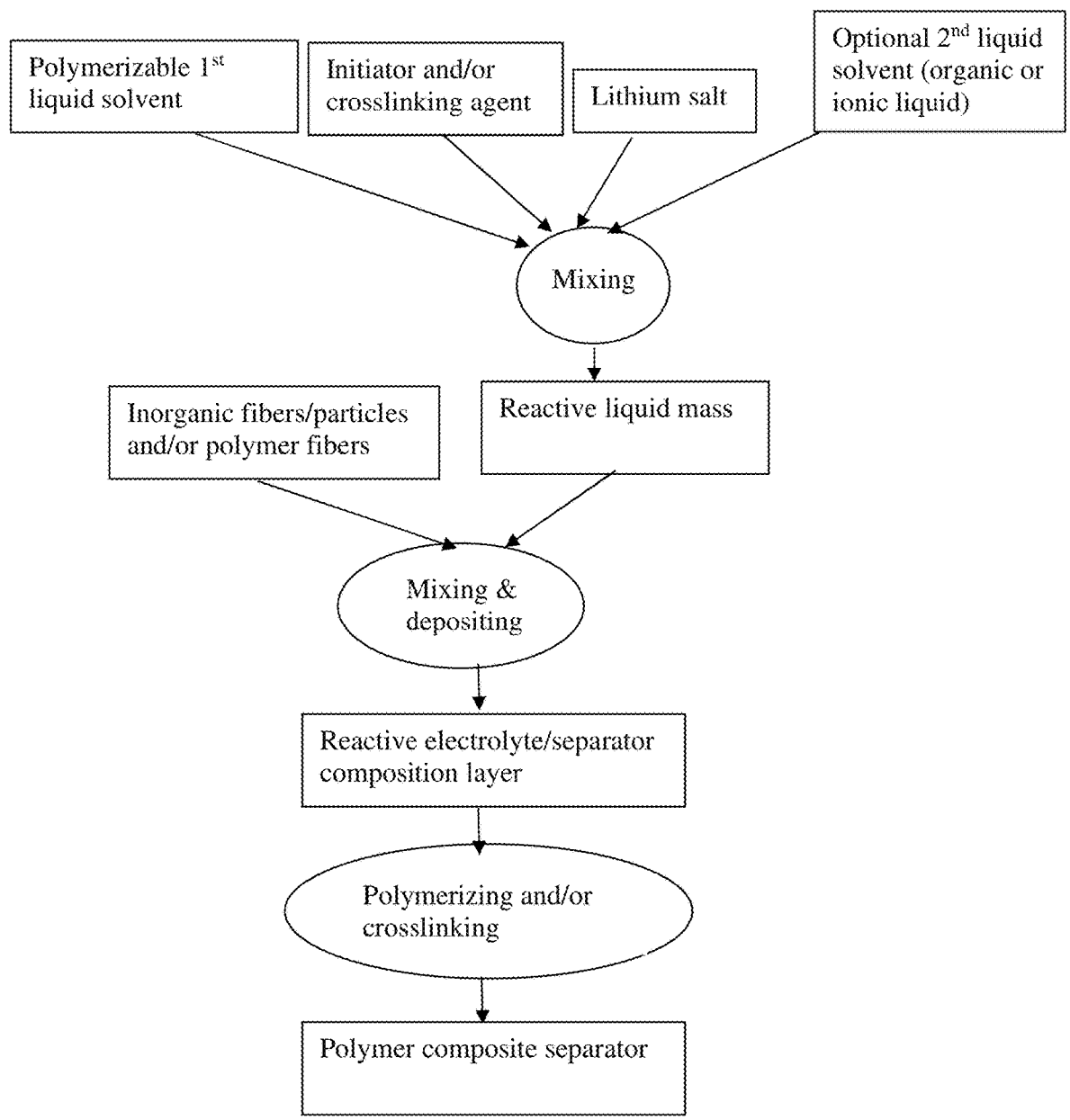
FIG. 5(A) flowchart illustrating a process for producing polymer composite separator according to some embodiments of the disclosure.

The disclosure also provides a process for manufacturing the polymer composite separator described above. As illustrated in FIG. 5(A), the process comprising (A) dispersing particles or fibers of the inorganic solid material or polymer fibers and the lithium salt in the first liquid solvent to form a liquid reactive mass or reactive slurry (the optional second liquid solvent may be added or mixed into the first liquid solvent at this stage); (B) dispensing and depositing a layer of the liquid reactive mass onto a solid substrate surface; and (C) polymerizing and/or curing the reactive mass to form the layer of polymer composite separator. Alternatively, the second liquid solvent may be added after the polymerization/crosslinking step.

This reactive mass (a precursor to the desired polymer) may comprise a monomer, an oligomer, or an uncured (but curable) polymer possibly dissolved in a liquid solvent where necessary. This precursor is subsequently cured (polymerized and/or crosslinked).

The solid substrate may be an anode current collector, an anode active material layer, or a cathode active material layer. In other words, this polymer composite separator can be directly deposited onto a layer of anode active material, an anode current collector, or a layer of cathode active material. This is achievable because curing of the polymer does not require a high temperature; curing temperature typically lower than 300° C. or even lower than 100° C. This is in stark contrast to the typically 900-1,200° C. required of sintering an inorganic solid electrolyte to form a ceramic separator. In addition, the presently disclosed separator is at least as good as a ceramic separator in terms of reducing interfacial impedance and stopping dendrite penetration.

Preferably, the process is a roll-to-roll process wherein step (B) comprises (i) continuously feeding a layer of the solid substrate (e.g. flexible metal film, plastic film, etc.) from a feeder roller to a dispensing zone where the reactive mass is dispensed and deposited onto the solid substrate to form a continuous layer of the reactive mass; (ii) moving the layer of the reactive mass into a reacting zone where the reactive mass is exposed to heat, ultraviolet (UV) light, or high-energy radiation (e.g., electron beam) to polymerize and/or cure the reactive mass to form a continuous layer of polymer composite; and (iii) collecting the polymer composite on a winding roller. This process is conducted in a reel-to-reel manner.

Figure 4:
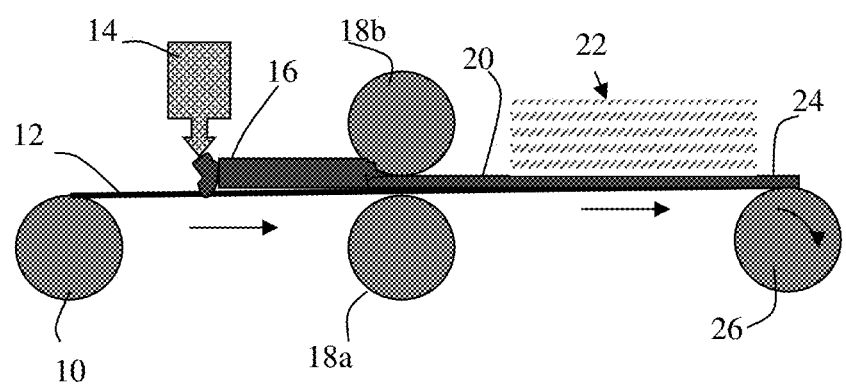
FIG. 4 Schematic of a roll-to-roll process for producing rolls of elastic composite separator in a continuous manner.

In certain embodiments, as illustrated in FIG. 4, the roll-to-roll process may begin with continuously feeding a solid substrate layer 12 (e.g., PET film) from a feeder roller 10. A dispensing device 14 is operated to dispense and deposit a reactive mass 16 (e.g. slurry) onto the solid substrate layer 12, which is driven toward a pair of rollers (18a, 18b). These rollers are an example of a provision to regulate or control the thickness of the reactive mass 20. The reactive mass 20, supported on the solid substrate, is driven to move through a reacting zone 22 which is provided with a curing means (heat, UV, high energy radiation, etc.). The partially or fully cured polymer composite 24 is collected on a winding roller 26. One may unwind the roll at a later stage.

The process may further comprise cutting and trimming the layer of polymer composite into one or multiple pieces of polymer composite separators. The process may further comprise combining an anode, the polymer composite separator, an electrolyte, and a cathode electrode to form a lithium battery.

Figure 5B:
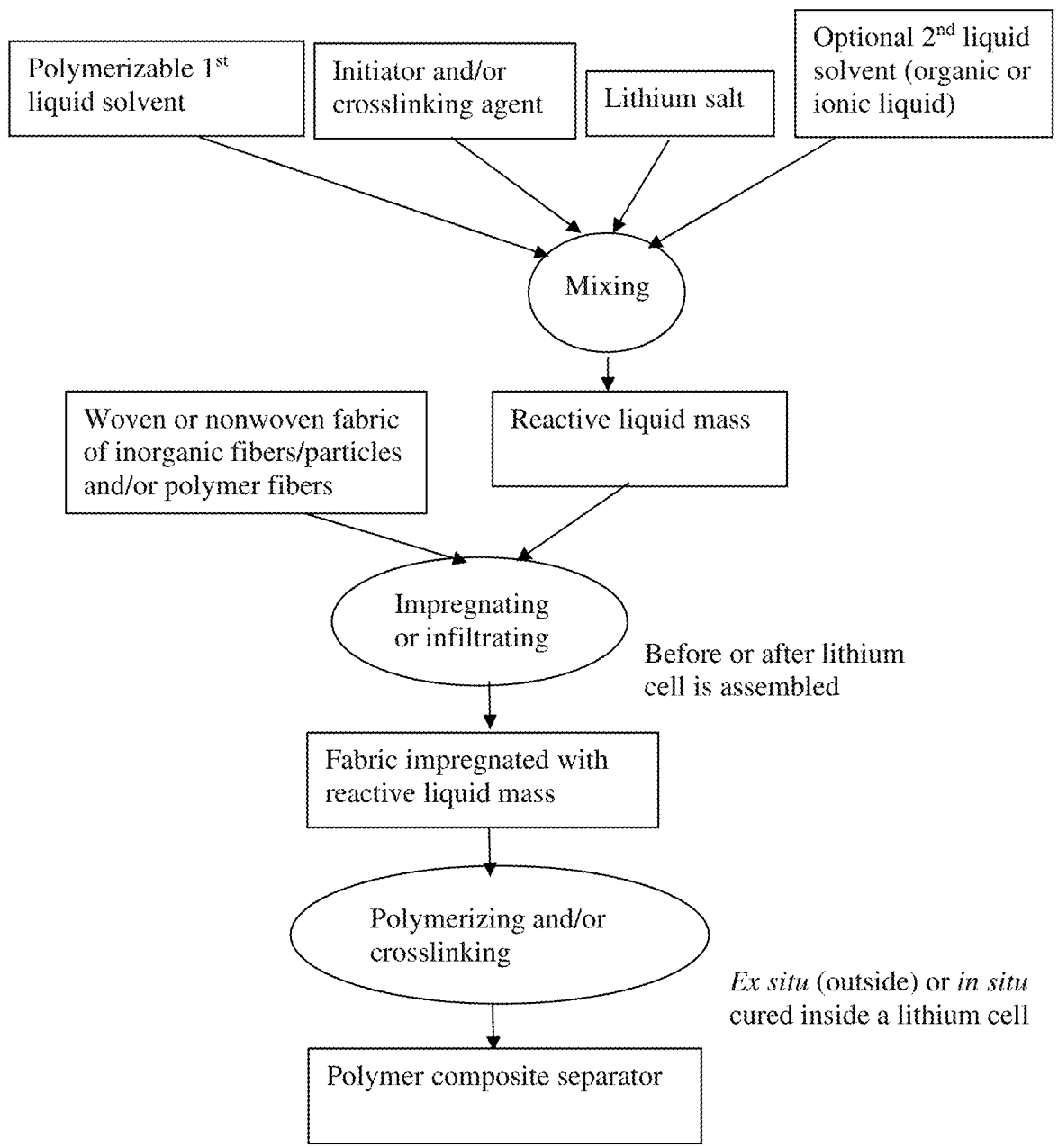
FIG. 5(B) flowchart illustrating a process for producing polymer composite separator according to some alternative embodiments of the disclosure.

As illustrated in FIG. 5(B), the disclosure further provides a process for manufacturing the polymer composite separator described above, the process comprising (A) forming a woven or nonwoven fabric comprising at least one of the polymer fibers and inorganic material fibers, and optional particles of the inorganic solid material; (B) dissolving or dispersing the lithium salt and the initiator or crosslinking agent in the first liquid solvent to form a liquid reactive mass (a second liquid solvent may be added at this stage); (C)

impregnating or infiltrating a desired amount of the liquid reactive mass into the fabric; and (D) polymerizing and/or crosslinking said reactive mass to form the layer of polymer composite separator. The process may further comprise a step (E) of combining an anode, the woven or nonwoven fabric, and a cathode to form a lithium battery cell, wherein step (C) or both steps (C) and (D) are conducted either before or after step (E).

In other words, the liquid reactive mass may be impregnated into the fabric and cured to form a polymer composite separator before this separator is combined with an anode and a cathode, along with other desired components, into a battery cell. Alternatively, one may choose to combine an anode, a layer of the woven or nonwoven fabric, and a cathode to form a dry lithium battery cell, which is followed by injection of the reactive mass into the dry cell and curing the reactive mass in situ (the liquid reactive mass permeates into the fabric and the anode and the cathode active layers and get cured thereafter).

The lithium battery may be a lithium metal battery, lithium-ion battery, lithium-sulfur battery, lithium-selenium battery, lithium-air battery, etc. The cathode active material in the lithium-sulfur battery may comprise sulfur or lithium polysulfide.

Example 1: Preparation of Solid Electrolyte Powder, Lithium Nitride Phosphate Compound (LIPON)

Particles of $Li_3PO_4$ (average particle size 4 μm) and urea were prepared as raw materials; 5 g each of $Li_3PO_4$ and urea was weighed and mixed in a mortar to obtain a raw material composition. Subsequently, the raw material composition was molded into 1 cm×1 cm×10 cm rod with a molding machine, and the obtained rod was put into a glass tube and evacuated. The glass tube was then subjected to heating at 500° C. for 3 hours in a tubular furnace to obtain a lithium nitride phosphate compound (LIPON). The compound was ground in a mortar into a powder form.

Example 2: Preparation of Solid Electrolyte Powder, Lithium Superionic Conductors with the $Li_{10}GeP_2S_{12}$ (LGPS)-Type Structure The starting materials, $Li_2S$ and $SiO_2$ powders, were milled to obtain fine particles using a ball-milling apparatus. These starting materials were then mixed together with $P_2S_5$ in the appropriate molar ratios in an Ar-filled glove box. The mixture was then placed in a stainless steel pot, and milled for 90 min using a high-intensity ball mill. The specimens were then pressed into pellets, placed into a graphite crucible, and then sealed at 10 Pa in a carbon-coated quartz tube. After being heated at a reaction temperature of 1,000° C. for 5 h, the tube was quenched into ice water. The resulting solid electrolyte material was then subjected to grinding in a mortar to form a powder sample to be later added as inorganic solid electrolyte particles dispersed in an intended polymer matrix of a composite separator (examples of binder/matrix polymers are given below).

Example 3: Preparation of Garnet-Type Solid Electrolyte Powder

The synthesis of the c-$Li_{6.25}Al_{0.25}La_3Zr_2O_{12}$ was based on a modified sol-gel synthesis-combustion method, resulting in sub-micron-sized particles after calcination at a temperature of 650° C. (J. van den Broek, S. Afyon and J. L. M. Rupp, Adv. Energy Mater., 2016, 6, 1600736).

For the synthesis of cubic garnet particles of the composition c-$Li_{6.25}Al_{0.25}La_3Zr_2O_{12}$, stoichiometric amounts of $LiNO_3$, $Al(NO_3)_3$-$9H_2O$, $La(NO_3)_3$-$6(H_2O)$, and zirconium (IV) acetylacetonate were dissolved in a water/ethanol mixture at temperatures of 70° C. To avoid possible Li-loss during calcination and sintering, the lithium precursor was taken in a slight excess of 10 wt % relative to the other precursors. The solvent was left to evaporate overnight at 95° C. to obtain a dry xerogel, which was ground in a mortar and calcined in a vertical tube furnace at 650° C. for 15 h in alumina crucibles under a constant synthetic airflow. Calcination directly yielded the cubic phase c-$Li_{6.25}Al_{0.25}La_3Zr_2O_{12}$, which was ground to a fine powder in a mortar for further processing.

The c-$Li_{6.25}Al_{0.25}La_3Zr_2O_{12}$ solid electrolyte pellets with relative densities of ~87±3% made from this powder (sintered in a horizontal tube furnace at 1070° C. for 10 h under $O_2$ atmosphere) exhibited an ionic conductivity of ~0.5× $10^{-3}$ S cm$^{-1}$ (RT). The garnet-type solid electrolyte with a composition of c-$Li_{6.25}Al_{0.25}La_3Zr_2O_{12}$ (LLZO) in a powder form was dispersed in several polymers discussed in the examples below.

Example 4: Preparation of Sodium Superionic Conductor (NASICON) Type Solid Electrolyte Powder The $Na_{3.1}Zr_{1.95}M_{0.05}Si_2PO_{12}$ (M=Mg, Ca, Sr, Ba) materials were synthesized by doping with alkaline earth ions at octahedral 6-coordination Zr sites. The procedure employed includes two sequential steps. Firstly, solid solutions of alkaline earth metal oxides (MO) and $ZrO_2$ were synthesized by high energy ball milling at 875 rpm for 2 h. Then NASICON $Na_{3.1}Zr_{1.95}M_{0.05}Si_2PO_{12}$ structures were synthesized through solid-state reaction of $Na_2CO_3$, $Zr_{1.95}M_{0.05}O_{3.95}$, $SiO_2$, and $NH_4H_2PO_4$ at 1260° C.

Example 5: Lithium Metal Cell Featuring an In Situ Polymerized VC as the First Liquid Solvent and TEP as a Second Liquid Solvent in an Aramid Nonwoven Fabric Layer and the Cell In one example, vinylene carbonate (VC) as a first liquid solvent, TEP as a second liquid solvent (flame retardant), and poly(ethylene glycol) diacrylate (PEGDA, as a cross-linking agent) were stirred under the protection of argon gas until a homogeneous solution was obtained. The TEP has the following chemical structure:

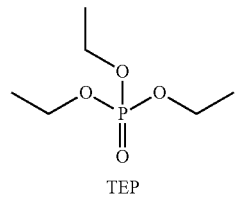

TEP

Subsequently, lithium hexafluoro phosphate, as a lithium salt, was added and dissolved in the above solution to obtain a reactive mixture solution, wherein the weight fractions of VC, TEP, polyethylene glycol diacrylate, and lithium hexafluoro phosphate were 80 wt %, 5 wt %, 10 wt %, and 5 wt %, respectively.

A lithium metal cell was made, comprising a lithium metal foil as the anode active material, a cathode comprising LiCoO$_2$, and a separator backbone composed of particles of Li$_7$La$_3$Zr$_2$O$_{12}$ embedded in an aramid fiber-based nonwoven fabric layer. This cell was then injected with the reactive solution mixture (10% by weight based on the total cell weight). The cell was then irradiated with electron beam at room temperature until a total dosage of 40 Gy was reached. In-situ polymerization of the polymerizable first liquid solvent in the battery cell was accomplished, resulting in a quasi-solid electrolyte that permeates into the cathode to wet the surfaces of LiCoO$_2$ particles, impregnates the porous separator layer (nonwoven fabric), and comes in contact with the lithium metal in the anode.

Additionally, particles of Li$_7$La$_3$Zr$_2$O$_2$ were mixed and dispersed in a liquid mixture of VC and TEP (0-30% TEP) to form reactive composite layers having a thickness from 5 to 35 μm. These reactive layers were then cured under comparable conditions as above to obtain free-standing polymer composite separator layers.

Example 6: VC as the Polymerizable First Solvent and an Unsaturated Phosphazene as a Second Solvent Similar procedure as in Example 1 was followed, but the second liquid solvent was an unsaturated phosphazene (UPA) having the following structure:

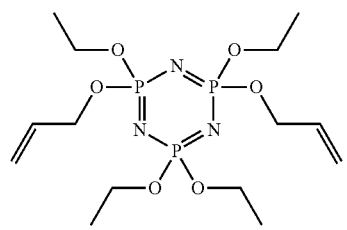 [SMILES: C=CCOP1(OCC)=NP(OCC)(OCC)=NP(OCC)(OCC=C)=N1]

This UPA was synthesized according to a procedure reported by Mason K. Harrup, et al. "Unsaturated phosphazenes as co-solvents for lithium-ion battery electrolytes," Journal of Power Sources 278 (2015) 794-801. The VC/UPA or FEC/UPA ratio was varied as 25/75, 50/50, and 75/25.

Example 7: VC as the First Liquid Solvent and Trifluoro-Phosphate (TFP) as the Second Liquid Solvent In this study, VC was used as the first liquid solvent, azodiisobutyronitrile (AIBN) as the initiator, lithium difluoro(oxalate) borate (LiDFOB) as the lithium salt, and TFP as the second flame-retardant liquid solvent. TFP has the following chemical structure:

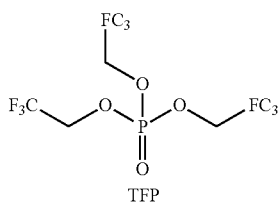

TFP

Solutions containing 1.5 M LiDFOB in VC and 0.2 wt % AIBN (vs VC) were prepared. Then, TFP (TFP/VC ratios being from 10/90 to 50/50) was added into the solution to form mixed electrolyte solutions. The electrolyte solutions were separately injected into different dry battery cells, allowing the electrolyte solution to permeate into the anode (wetting out the anode active material; e.g., graphite particles), into the cathode (wetting out the cathode active material; e.g., NCM-532 particles), and into the porous separator layer (porous nonwoven of PAN nano-fibers and LIPON-type inorganic solid electrolyte particles). The battery cells were stored at 60° C. for 24 h and then 80° C. for another 2 h to obtain polymerized VC that contained TFP in their matrix of polymer chains. The polymerization scheme of VC is shown below (Reaction scheme 1):

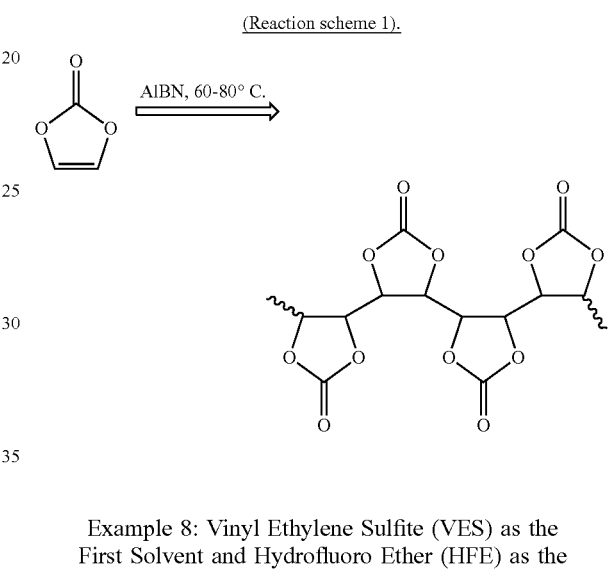

(Reaction scheme 1).

Example 8: Vinyl Ethylene Sulfite (VES) as the First Solvent and Hydrofluoro Ether (HFE) as the Second Solvent Under the protection of an argon gas atmosphere, vinyl ethylene sulfite (VES), hydrofluoro ether (HFE), and tetra (ethylene glycol) diacrylates were stirred evenly to form a solution. Bis trifluoromethyl sulfimide lithium was then dissolved in the solution to obtain a solution mixture. In this solution mixture, the weight fractions for the four ingredients were VEC (40%). HFE (20%), tetra(ethylene glycol) diacrylates (20%), and bis trifluoromethyl sulfimide (10%).

The mixed solution (reactive mass) was added to a lithium-ion cell having an NCM cathode, graphite anode, and porous SiO$_2$/glass fibers mat. After the mixed solution was injected, the mixed solution accounted for 3% of the total cell weight. The cell was exposed to electron beam at 50° C. until a dosage of 20 kGy was reached. VEC was polymerized and crosslinked to become a solid polymer, but FIFE remained as a liquid.

On a separate basis, several pieces of porous SiO/glass fiber mat were dipped into the reactive mass (without HFE) and cured under the same conditions to obtain polymer composite separator layers. Additionally, one of such polymer composite layers was coated with a layer of VEC-based reactive mass and then cured so that there was a layer of neat polymer (free of any inorganic particles or fibers) on one side of the resulting composite separator layer.

Example 9: Lithium-Ion Cell Featuring an In Situ Polymerized Phenyl Vinyl Sulfide (PVS) in the Presence of a Second Solvent TMS (PVS/TMS Ratio=9/1-10/0)

TMS has the following chemical formula:

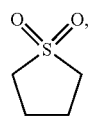

The lithium-ion cells prepared in this example comprise an anode of meso-carbon micro-beads (MCMB, a type of artificial graphite supplied from China Steel Chemical Co., Taiwan), a cathode of NCM-622 particles, and a porous nonwoven fabric of aramid fibers partially impregnated with poly(vinylidene fluoride)-hexafluoropropylene as a separator.

Phenyl vinyl sulfide (first liquid solvent), TMS (second solvent), CTA (chain transfer agent, shown below), AIBN (initiator, 1.0%), and 5% by weight of lithium trifluoromethanesulfonate ($LiCF_3SO_3$) were mixed to form a reactive liquid mass. This reactive liquid mass was injected into the lithium-ion cell, and heated at 60° C. to obtain a battery cell containing an in situ cued polymer electrolyte. Additionally, a polymer composite separator was made by impregnating the reactive liquid mass into the pores of a layer of porous nonwoven fabric of aramid fibers partially impregnated with (bonded by) poly(vinylidene fluoride)-hexafluoropropylene. This was followed by curing under comparable conditions.

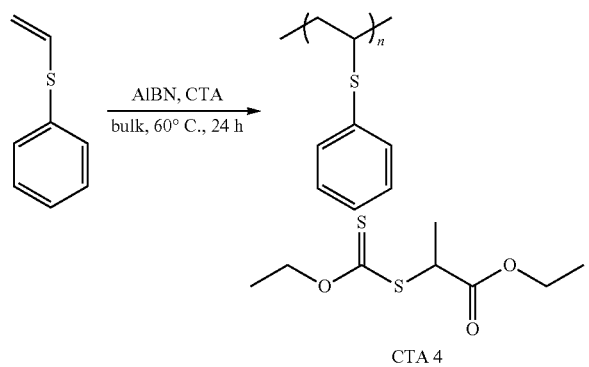

CTA 4

Example 10: Lithium-Ion Cell Featuring a Separator Comprising In Situ Polymerized Phenyl Vinyl Sulfone The lithium-ion cells prepared in this example comprise an anode of graphene-protected Si particles, a cathode of NCM-622 particles, and a porous membrane comprising particles of NASICON ($Na_{3.1}Zr_{1.95}M_{0.05}Si_2PO_{12}$) bonded together by a pentaerythritol tetraacrylate-based polymer.

Phenyl vinyl sulfone (PVS) can be polymerized with several anionic-type initiators; e.g., n-BuLi, $ZnEt_2$, $LiN(CH_2)_2$, and $NaNH_2$. The second solvent may be selected from pyridine, sulfolane, Trimethyl phosphate (TMP), Trifluoro-Phosphate (TFP), etc. Trimethyl phosphate has the following chemical structure:

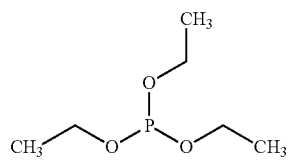

A mixture of PVS, TFP, n-BuLi (1.0% relative to PVS), and $LiBF_4$ (0.5 M) was thoroughly mixed and injected into the battery cell, which was maintained at 30° C. overnight to cure the polymer.

In conclusion, the in situ cured polymer composite-based separator strategy is surprisingly effective in alleviating the problems of lithium metal dendrite formation and lithium metal-electrolyte reactions that otherwise lead to rapid capacity decay and potentially internal shorting and explosion of the lithium secondary batteries. The presence of a small amount of a second liquid solvent may be designed to impart high lithium-ion conductivity to the polymer. This second liquid may also help to maintain a good contact between the current collector (or the deposited lithium film during the charging procedure) and the separator, enabling uniform re-deposition of lithium ions without interruption.

I claim:

1. A flame-resistant polymer composite separator for use in a lithium battery, wherein the polymer composite separator comprises (a) a binder or matrix polymer; (b) 0.1% to 50% by weight of a lithium salt dispersed in the polymer; and (c) from 30% to 99% by weight of particles or fibers of an inorganic material or polymer fibers that are dispersed in or bonded by the polymer, wherein the polymer is a polymerization or crosslinking product of a reactive additive comprising (i) a first liquid solvent that is polymerizable, (ii) an initiator or crosslinking agent, and (iii) the lithium salt and wherein the polymer composite separator has a thickness from 50 nm to 100 μm and a lithium ion conductivity from $10^{-8}$ S/cm to $5 \times 10^{-2}$ S/cm at room temperature;
wherein said inorganic material particles are non-uniformly distributed in the polymer matrix in such a manner that a concentration of the inorganic material particles in one region of the polymer matrix is greater than a concentration of the inorganic material particles in another region.

2. The polymer composite separator of claim 1, wherein the first liquid solvent is selected from the group consisting of vinylene carbonate, ethylene carbonate, fluoroethylene carbonate, vinyl sulfite, vinyl ethylene sulfite, vinyl ethylene carbonate, 1,3-propyl sultone, 1,3,5-trioxane (TXE), 1,3-acrylic-sultones, methyl ethylene sulfone, methyl vinyl sulfone, ethyl vinyl sulfone, methyl methacrylate, vinyl acetate, acrylamide, 1,3-dioxolane (DOL), fluorinated ethers, fluorinated esters, sulfides, dinitriles, acrylonitrile (AN), sulfates, siloxanes, silanes, N-methylacetamide, acrylates, ethylene glycols, tetrahydrofuran, combinations thereof, and combinations thereof with phosphates, phosphonates, phosphinates, phosphines, phosphine oxides, phosphonic acids, phosphorous acid, phosphites, phosphoric acids, phosphazene compounds, ionic liquids, derivatives thereof, and mixtures thereof.

3. The polymer composite separator of claim 1, wherein said inorganic material comprises particles of an inorganic solid electrolyte material selected from an oxide, sulfide, hydride, halide, borate, phosphate, lithium phosphorus oxynitride (LiPON), Garnet-type, lithium superionic conductor (LISICON) type, sodium superionic conductor (NA-SICON) type, or a combination thereof.

4. The polymer composite separator of claim 1, wherein said inorganic material particles comprise a material selected from a transition metal oxide, aluminum oxide, silicon dioxide, transition metal sulfide, transition metal selenide, alkylated ceramic particles, metal phosphate, metal carbonate, or a combination thereof, or the inorganic material fibers are selected from ceramic fibers, glass fibers, or a combination thereof.

5. The polymer composite separator of claim 1, wherein said lithium salt is selected from lithium perchlorate (LiClO$_4$), lithium hexafluorophosphate (LiPF$_6$), lithium borofluoride (LiBF$_4$), lithium hexafluoroarsenide (LiAsF$_6$), lithium trifluoro-methanesulfonate (LiCF$_3$SO$_3$), LiN(CF$_3$SO$_2$)$_2$, lithium bis(oxalato)borate (LiBOB), lithium oxalyldifluoroborate (LiBF$_2$C$_2$O$_4$), lithium nitrate (LiNO$_3$), Li-fluoroalkyl-phosphates (LiPF$_3$(CF$_2$CF$_3$)$_3$), lithium bis-perfluoro-ethylsulfonylimide (LiBETI), lithium bis(fluorosulfonyl)imide, an ionic liquid-based lithium salt (Li$_2$CO$_3$, Li$_2$O, Li$_2$C$_2$O$_4$, LiOH, LiX, ROCO$_2$Li, HCOLi, ROLi, (ROCO$_2$Li)$_2$, (CH$_2$OCO$_2$Li)$_2$, Li$_2$S, Li$_x$SO$_y$, or a combination thereof, wherein X=F, Cl, I, or Br, R=a hydrocarbon group, x=0-1, y=1-4).

6. The polymer composite separator of claim 1, further comprising a second liquid solvent that permeates into the separator wherein the second liquid solvent has a higher flash point or lower vapor pressure as compared to the first liquid solvent.

7. The polymer composite separator of claim 6, wherein the second liquid solvent is selected from the group consisting of fluoroethylene carbonate, vinyl sulfite, vinyl ethylene sulfite, 1,3-propyl sultone, 1,3,5-trioxane (TXE), 1,3-acrylic-sultones, methyl ethylene sulfone, methyl vinyl sulfone, ethyl vinyl sulfone, methyl methacrylate, vinyl acetate, acrylamide, 1,3-dioxolane (DOL), fluorinated ethers, fluorinated esters, fluorinated vinyl esters, fluorinated vinyl ethers, sulfones, sulfides, dinitriles, acrylonitrile (AN), sulfates, siloxanes, silanes, N-methylacetamide, acrylates, ethylene glycols, tetrahydrofuran, phosphates, phosphonates, phosphinates, phosphines, phosphine oxides, phosphonic acids, phosphorous acid, phosphites, phosphoric acids, phosphazene compounds, ionic liquids, derivatives thereof, and mixtures thereof.

8. The polymer composite separator of claim 6, wherein the first or the second liquid solvent comprises a sulfone or sulfide selected from vinyl sulfone, allyl sulfone, alkyl vinyl sulfone, aryl vinyl sulfone, vinyl sulfide, TrMS, MTrMS, TMS, EMS, MMES, EMES, EMEES, or a combination thereof:

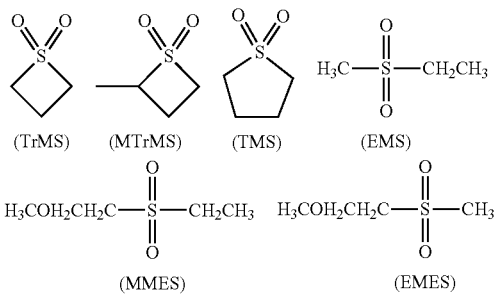

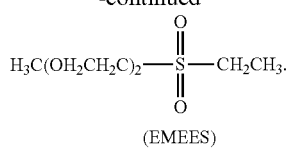
(EMEES)

9. The polymer composite separator of claim 8, wherein the vinyl sulfone or sulfide is selected from ethyl vinyl sulfide, allyl methyl sulfide, phenyl vinyl sulfide, phenyl vinyl sulfoxide, allyl phenyl sulfone, allyl methyl sulfone, divinyl sulfone, or a combination thereof.

10. The polymer composite separator of claim 6, wherein the first or the second liquid solvent comprises a nitrile, a dinitrile selected from AND, GLN, or SEN, or a combination thereof:

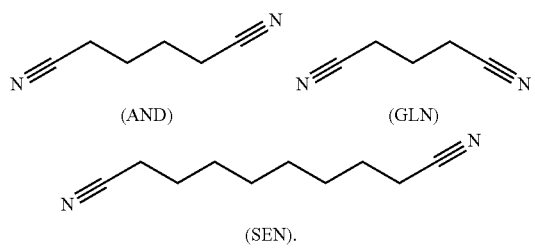

11. The polymer composite separator of claim 6, wherein the first or the second liquid solvent comprises a phosphate selected from allyl-type, vinyl-type, styrenic-type and (meth)acrylic-type monomers bearing a phosphonate moiety.

12. The polymer composite separator of claim 6, wherein the first liquid solvent or the second liquid solvent is selected from the group consisting of 2-alkoxy (or phenoxy)-2-oxo-1,3,2-dioxaphospholane (I) and 2-alkoxy (or phenoxy)-2-oxo-1,3,2-dioxaphosphorinane (II), derivatives thereof, and combinations thereof:

(I)

(II)

X = Alkyl; Aryl

13. The polymer composite separator of claim 6, wherein the first liquid solvent or the second liquid solvent comprises phosphate, phosphonate, phosphonic acid, or phosphite selected from TMP, TEP, TFP, TDP, DPOF, DMMP, DMMEMP, tris(trimethylsilyl)phosphite (TTSPi), alkyl phosphate, triallyl phosphate (TAP), a combination thereof, wherein TMP, TEP, TFP, TDP, DPOF, DMMP, and DMMEMP have the following chemical formulae:

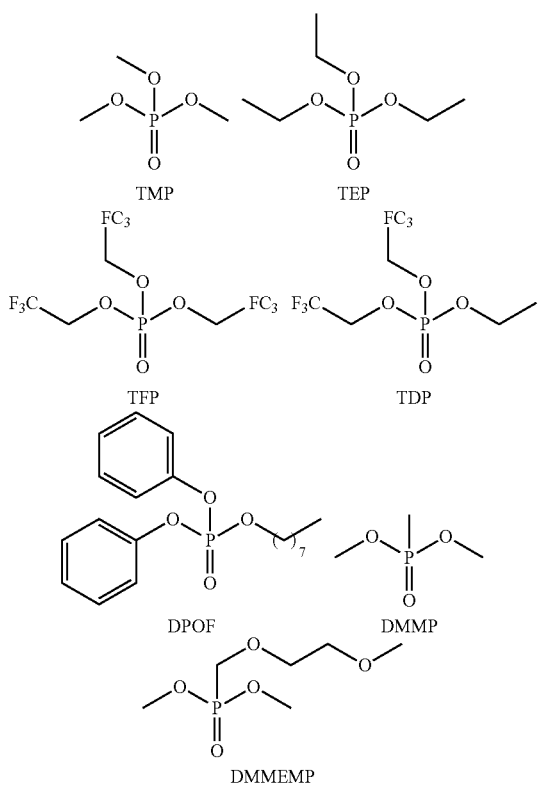

wherein an end group thereof or a functional group attached thereof comprises unsaturation for polymerization.

14. The polymer composite separator of claim 6, wherein the first liquid solvent or the second liquid solvent comprises phosphonate vinyl monomer selected from the group consisting of phosphonate bearing allyl monomers, phosphonate bearing vinyl monomers, phosphonate bearing styrenic monomers, phosphonate bearing (meth)acrylic monomers, vinylphosphonic acids, and combinations thereof.

15. The polymer composite separator of claim 14, wherein the phosphonate bearing allyl monomer is selected from a Dialkyl allylphosphonate monomer or Dioxaphosphorinane allyl monomer; the phosphonate bearing vinyl monomers is selected from a Dialkyl vinyl phosphonate monomer or Dialkyl vinyl ether phosphonate monomer; the phosphonate bearing styrenic monomer is selected from α-, β-, or p-vinylbenzyl phosphonate monomers; or the phosphonate bearing (meth)acrylic monomer is selected from a monomer having a phosphonate group linked to the acrylate double bond, a phosphonate groups linked to the ester, or a phosphonate groups linked to the amide.

16. The polymer composite separator of claim 1, wherein the crosslinking agent comprises a compound having at least one reactive group selected from a hydroxyl group, an amino group, an imino group, an amide group, an acrylic amide group, an amine group, an acrylic group, an acrylic ester group, or a mercapto group in the molecule.

17. The polymer composite separator of claim 1, wherein the crosslinking agent is selected from poly(diethanol) diacrylate, poly(ethyleneglycol) dimethacrylate, poly(diethanol) dimethylacrylate, poly(ethylene glycol) diacrylate, or a combination thereof.

18. The polymer composite separator of claim 1, wherein a concentration of the inorganic material particles in one surface region of the polymer matrix is at least 60% by volume and is greater than a concentration of the inorganic material particles in a core region of the polymer matrix.

19. The polymer composite separator of claim 1, wherein the particles or fibers of an inorganic material and/or polymer fibers are in a woven or nonwoven fabric form.

20. A lithium secondary battery comprising a cathode, an anode, and the flame-resistant polymer composite separator of claim 1 disposed between the cathode and the anode.

21. The lithium secondary battery of claim 20, wherein the battery is a lithium metal battery and the anode has an anode current collector but initially the anode has no lithium or lithium alloy as an anode active material supported by said anode current collector when the battery is made and prior to a charge or discharge operation of the battery.

22. The lithium secondary battery of claim 20, wherein the battery is a lithium metal battery and the anode has an anode current collector and an amount of lithium or lithium alloy as an anode active material supported by said anode current collector.

23. The lithium secondary battery of claim 20, wherein the battery is a lithium-ion battery and the anode has an anode current collector and a layer of an anode active material supported by said anode current collector, wherein the anode active materials is selected from the group consisting of: (a) silicon (Si), germanium (Ge), tin (Sn), lead (Pb), antimony (Sb), phosphorus (P), bismuth (Bi), zinc (Zn), aluminum (Al), titanium (Ti), nickel (Ni), cobalt (Co), and cadmium (Cd); (b) alloys or intermetallic compounds of Si, Ge, Sn, Pb, Sb, Bi, Zn, Al, Ti, Ni, Co, or Cd with other elements; (c) oxides, carbides, nitrides, sulfides, phosphides, selenides, and tellurides of Si, Ge, Sn, Pb, Sb, Bi, Zn, Al, Ti, Fe, Ni, Co, V, or Cd, and their mixtures, composites, or lithium-containing composites; (d) salts and hydroxides of Sn; (e) lithium titanate, lithium manganate, lithium aluminate, lithium titanium niobium oxide, lithium-containing titanium oxide, lithium transition metal oxide, $ZnCO_2O_4$; (f) carbon or graphite particles (g) prelithiated versions thereof; and (h) combinations thereof.

24. The lithium secondary battery of claim 20, wherein said battery further comprises, in addition to the solid electrolyte in the separator, a working electrolyte in ionic contact with an anode active material and/or a cathode active material wherein said working electrolyte is selected from an organic liquid electrolyte, ionic liquid electrolyte, polymer gel electrolyte, polymer solid electrolyte, solid-state inorganic electrolyte, quasi-solid electrolyte having a lithium salt dissolved in an organic or ionic liquid with a lithium salt concentration higher than 2.0 M, or a combination thereof.

25. The lithium secondary battery of claim 20, wherein the polymer is also present in the anode or the cathode and the polymer comprises the lithium salt dispersed therein.

26. The lithium secondary battery of claim 20, wherein said cathode comprises a cathode active material selected from an inorganic material, an organic material, a polymeric material, or a combination thereof.

27. The lithium secondary battery of claim 26, wherein said inorganic material, as a cathode active material, is selected from a metal oxide, metal phosphate, metal silicide, metal selenide, transition metal sulfide, metal fluoride, metal chloride, or a combination thereof.

28. The lithium secondary battery of claim 26, wherein said inorganic cathode active material is selected from a lithium cobalt oxide, lithium nickel oxide, lithium manganese oxide, lithium vanadium oxide, lithium-mixed metal oxide, lithium iron phosphate, lithium manganese phosphate, lithium vanadium phosphate, lithium mixed metal phosphate, lithium metal silicide, or a combination thereof.

29. The lithium secondary battery of claim 26, wherein said inorganic cathode active material is selected from a lithium transition metal silicate, denoted as $Li_2MSiO_4$ or $Li_2Ma_xMb_ySiO_4$, wherein M and Ma are selected from Fe, Mn, Co, Ni, V, or VO; Mb is selected from Fe, Mn, Co, Ni, V, Ti, Al, B, Sn, or Bi; and $x+y \leq 1$.

30. The lithium secondary battery of claim 26, wherein said cathode active material is selected from lithium nickel manganese oxide ($LiNi_aMn_{2-a}O_4$, $0<a<2$), lithium nickel manganese cobalt oxide ($LiNi_nMn_mCo_{1-n-m}O_2$, $0<n<1$, $0<m<1$, $n+m<1$), lithium nickel cobalt aluminum oxide ($LiNi_cCo_dAl_{1-c-d}O_2$, $0<c<1$, $0<d<1$, $c+d<1$), lithium manganate ($LiMn_2O_4$), lithium iron phosphate ($LiFePO_4$), lithium manganese oxide ($LiMnO_2$), lithium cobalt oxide ($LiCoO_2$), lithium nickel cobalt oxide ($LiNi_pCo_{1-p}O_2$, $0<p<1$), or lithium nickel manganese oxide ($LiNi_qMn_{2-q}O_4$, $0<q<2$).

31. The lithium secondary battery of claim 27, wherein said metal oxide or metal phosphate is selected from a layered compound $LiMO_2$, spinel compound $LiM_2O_4$, olivine compound $LiMPO_4$, silicate compound $Li_2MSiO_4$, Tavorite compound $LiMPO_4F$, borate compound $LiMBO_3$, or a combination thereof, wherein M is a transition metal or a mixture of multiple transition metals.

* * * * *